US010508715B2

(12) United States Patent
Cave et al.

(10) Patent No.: US 10,508,715 B2
(45) Date of Patent: Dec. 17, 2019

(54) MOTOR ASSEMBLY FOR DRAWWORKS SYSTEMS AND METHODS

(71) Applicant: Cameron International Corporation, Houston, TX (US)

(72) Inventors: Peter William Cave, Coquitlam (CA); Jonathan David Deagle, Vancouver (CA); Michael Netecke, Houston, TX (US); Rogelio Cabrera, Houston, TX (US)

(73) Assignee: CAMERON INTERNATIONAL CORPORATION, Houston, TX (US)

( * ) Notice: Subject to any disclaimer, the term of this patent is extended or adjusted under 35 U.S.C. 154(b) by 315 days.

(21) Appl. No.: 15/450,312

(22) Filed: Mar. 6, 2017

(65) Prior Publication Data

US 2018/0252299 A1 Sep. 6, 2018

(51) Int. Cl.
| | |
|---|---|
| *B66D 1/22* | (2006.01) |
| *F16H 3/54* | (2006.01) |
| *B66D 1/82* | (2006.01) |
| *B66D 5/02* | (2006.01) |
| *E21B 19/00* | (2006.01) |
| *H02P 29/024* | (2016.01) |
| *H02K 7/116* | (2006.01) |

(52) U.S. Cl.
CPC .............. *F16H 3/54* (2013.01); *B66D 1/82* (2013.01); *B66D 5/02* (2013.01); *E21B 19/008* (2013.01); *H02P 29/024* (2013.01); *F16H 2200/0034* (2013.01); *F16H 2200/2005* (2013.01); *F16H 2200/2064* (2013.01); *F16H 2200/2094* (2013.01); *H02K 7/116* (2013.01)

(58) Field of Classification Search
CPC ..... F16H 2200/2005; F16H 2200/2094; F16H 2200/0034; F16H 2200/2097; F16H 3/60; B66D 1/225
See application file for complete search history.

(56) References Cited

U.S. PATENT DOCUMENTS

| | | | |
|---|---|---|---|
| 1,731,879 A | 10/1929 | Thompson | |
| 2,271,428 A | 1/1939 | Harry | |
| 2,345,662 A | 4/1944 | Gordon et al. | |
| 2,367,041 A | 1/1945 | Moore et al. | |
| 2,370,855 A | 3/1945 | Gordon | |
| 3,460,807 A * | 8/1969 | Vasilievich | B66D 1/225 254/297 |

(Continued)

OTHER PUBLICATIONS

Office Action for the cross referenced U.S. Appl. No. 15/450,302 dated Sep. 7, 2018.

(Continued)

*Primary Examiner* — Sherry L Estremsky
(74) *Attorney, Agent, or Firm* — Helene Raybaud

(57) ABSTRACT

A system includes a first transmission having a first planetary gearset, a first drive shaft, and a first annular sleeve. The first annular sleeve is positioned circumferentially about the first drive shaft, and the first annular sleeve is configured to move axially relative to the first drive shaft and the first planetary gearset from a first axial position in which the first annular sleeve engages a first sun gear of the first planetary gearset to a second axial position in which the first annular sleeve engages a first ring gear of the first planetary gearset to adjust a gear ratio of the first transmission.

20 Claims, 21 Drawing Sheets

(56) References Cited

U.S. PATENT DOCUMENTS

| | | | |
|---|---|---|---|
| 3,550,787 A | 12/1970 | Hicks | |
| 3,738,614 A | 6/1973 | Peterson | |
| 4,434,971 A | 3/1984 | Cordrey | |
| 4,602,525 A * | 7/1986 | Moroto | F16H 3/62 475/205 |
| 4,907,473 A * | 3/1990 | Fujitani | B60K 17/346 180/250 |
| 6,152,848 A * | 11/2000 | Williams | B60K 17/3462 475/204 |
| 6,182,945 B1 | 2/2001 | Dyer et al. | |
| 6,793,203 B2 | 9/2004 | Heinrichs et al. | |
| 6,840,880 B2 * | 1/2005 | Glassner | B60K 17/3467 180/247 |
| 7,270,312 B1 | 9/2007 | Phipps | |
| 7,487,954 B2 | 2/2009 | Copp et al. | |
| 7,896,315 B2 | 3/2011 | Faust | |
| 8,820,719 B2 | 9/2014 | Ferrari | |
| 9,637,022 B2 * | 5/2017 | Gavling | B60L 15/025 |
| 10,018,259 B2 * | 7/2018 | Arnelof | F16H 37/046 |
| 2003/0111653 A1 | 6/2003 | Heinrichs et al. | |
| 2010/0127229 A1 * | 5/2010 | Kverneland | B66D 1/12 254/356 |
| 2010/0206831 A1 | 8/2010 | Faust | |
| 2014/0284108 A1 | 9/2014 | Pendleton et al. | |
| 2014/0364264 A1 * | 12/2014 | Sten | F16H 48/36 475/150 |
| 2015/0083985 A1 | 3/2015 | Lervik | |
| 2015/0375975 A1 | 12/2015 | Flateland | |
| 2016/0003351 A1 * | 1/2016 | Park | F16H 3/54 475/153 |
| 2016/0090279 A1 | 3/2016 | Hausladen et al. | |
| 2016/0289052 A1 | 10/2016 | Sorensen et al. | |
| 2017/0001845 A1 | 1/2017 | Moll | |
| 2017/0305729 A1 | 10/2017 | Lautwein et al. | |
| 2017/0362067 A1 | 12/2017 | Hiekata et al. | |
| 2018/0100554 A1 | 4/2018 | Neteche et al. | |
| 2018/0251353 A1 | 9/2018 | Netecke et al. | |

OTHER PUBLICATIONS

Final Office Action for the cross referenced U.S. Appl. No. 15/450,302 dated Jan. 17, 2019.

"Intelligent Drilling Solutions, ""AC Gear-Driven Drawworks for Land and Offshore Rigs,"" brochure, retrieved at http:l/idspilfield.com/products/ac-drawworks/ on Dec. 12, 2018".

Namco, Machine & Gear Works Ltd., "AC Gear Driven Drawwowrks," brochure, released on Dec. 3, 2009.

Varco Systems, "Automated Drawworks Systems," brochure, copyright 2002.

* cited by examiner

MOTOR ASSEMBLY FOR DRAWWORKS SYSTEMS AND METHODS

BACKGROUND

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Natural resources, such as oil and gas, are used as fuel to power vehicles, heat homes, and generate electricity, in addition to various other uses. Once a desired resource is discovered below the surface of the earth, drilling and production systems are often employed to access and extract the resource. These systems may be located onshore or offshore depending on the location of the desired resource. Further, such systems may include a wide variety of components, such as various casings, fluid conduits, tools, and the like, that facilitate extraction of the resource from a well during drilling or extraction operations. In some systems, a drawworks system (e.g., hoisting or lifting assembly) is provided to raise and/or to lower certain components relative to the well. However, some drawworks systems may be large and/or complex. Furthermore, some drawworks systems may be difficult to maintain and/or repair, thereby resulting in increased downtime during certain maintenance and/or repair operations, and/or resulting in inefficient drilling operations.

BRIEF DESCRIPTION OF THE DRAWINGS

Various features, aspects, and advantages of the present disclosure will become better understood when the following detailed description is read with reference to the accompanying figures in which like characters represent like parts throughout the figures, wherein.

DETAILED DESCRIPTION OF SPECIFIC EMBODIMENTS

Figure 1:
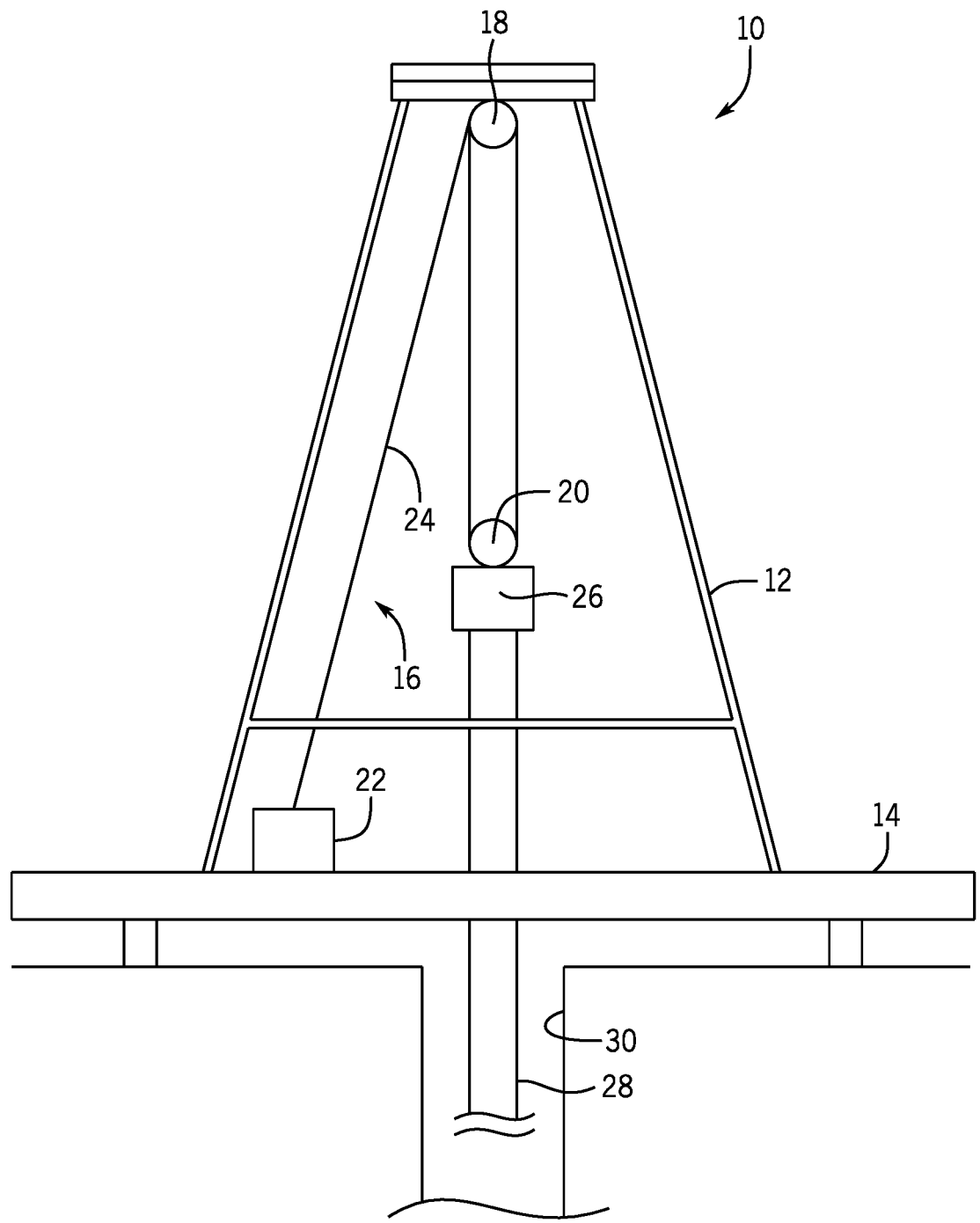
FIG. 1 is a schematic diagram of a portion of a drilling and production system, in accordance with an embodiment of the present disclosure.

One or more specific embodiments of the present disclosure will be described below. These described embodiments are only exemplary of the present disclosure. Additionally, in an effort to provide a concise description of these exemplary embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

The present embodiments are generally directed to drawworks systems and methods (e.g., hoisting or lifting systems and methods) for use within a drilling and production system. Certain embodiments include a drawworks system having one or more motors, a gearbox, a brake, and a drum (e.g., annular drum) mounted on a drum shaft. The drum is configured to support a cable (e.g., wire) that is coupled to components of a hoisting system from which drilling equipment, such as a drill string, is suspended. Rotation of the drum causes the cable to retract (e.g., wrap or wind about the drum) and/or to extend (e.g., unwrap or unwind from the drum) to raise and/or to lower the drilling equipment relative to a drill floor. For example, rotation of the drum in a first direction may cause the cable to extend to lower the drill string to facilitate drilling a wellbore through subterranean formations. In certain embodiments, the drum shaft may be coupled to an output shaft of the gearbox, and the one or more motors may be coupled to an input shaft of the gearbox to enable the one or more motors to drive rotation of the drum.

As discussed in more detail below, in certain embodiments, both the gearbox and the brake are supported by a gearbox housing and/or are positioned on one side of the drum (e.g., on the same side of the drum along an axial axis of the drawworks system). In certain embodiments, the drum shaft, the output shaft of the gearbox, and the brake are aligned and share a common rotational axis (e.g., coaxial). In certain embodiments, the drum shaft extends through the gearbox and to the brake, which is directly coupled to the drum shaft to enable the brake to block rotation of the drum.

Additionally or alternatively, in certain embodiments, each of the one or more motors may include or be coupled to a respective transmission. For example, in some embodiments, the drawworks system may include at least two motors, each coupled to a respective multi-speed transmission. As discussed in more detail below, such a configuration may enable the drawworks system to efficiently lift a load when using both motors and to also lift the load at a reduced speed using only a single motor (e.g., after failure of the other motor). The disclosed embodiments may enable reduced downtime (e.g., after failure of the other motor) and/or efficient drilling operations, for example. The disclosed embodiments may also provide a compact drawworks system and/or may facilitate maintenance and/or repair of the components of the drawworks system.

With the foregoing in mind, FIG. 1 is a schematic diagram of a portion of a drilling and production system 10, in accordance with an embodiment of the present disclosure. As shown, the system 10 includes a mast 12 positioned on a drill floor 14 and a hoisting system 16 configured to raise and to lower drilling equipment relative to the drill floor 14. In the illustrated embodiment, the hoisting system 16 includes a crown block 18, a traveling block 20, and a drawworks system 22. As shown, a cable 24 (e.g., wire) extends from the drawworks system 22 and couples the crown block 18 to the traveling block 20. In the illustrated embodiment, a top drive 26 is coupled to the traveling block 20, and a drill string 28 is suspended from the top drive 26 and extends through the drill floor 14 into a wellbore 30. The top drive 26 may be configured to rotate the drill string 28, and the hoisting system 16 may be configured to raise and to lower the top drive 26 and the drill string 28 relative to the drill floor 14 to facilitate drilling of the wellbore 30.

Any suitable number of lines of the cable 24 may extend between the crown block 18 and the traveling block 20, and the cable 24 may have any suitable diameter, such as a diameter in a range of 1 to 7 centimeters (cm) or a diameter between approximately 3 to 5, 4 to 4.75, or 4.25 to 4.5 cm. While FIG. 1 illustrates a land-based drilling and production system 10 to facilitate discussion, it should be understood that the disclosed embodiments may be adapted for use within an offshore drilling and production system. Furthermore, it should be understood that the disclosed drawworks system 22 may be utilized in any of a variety of drilling and production systems.

Figure 2:
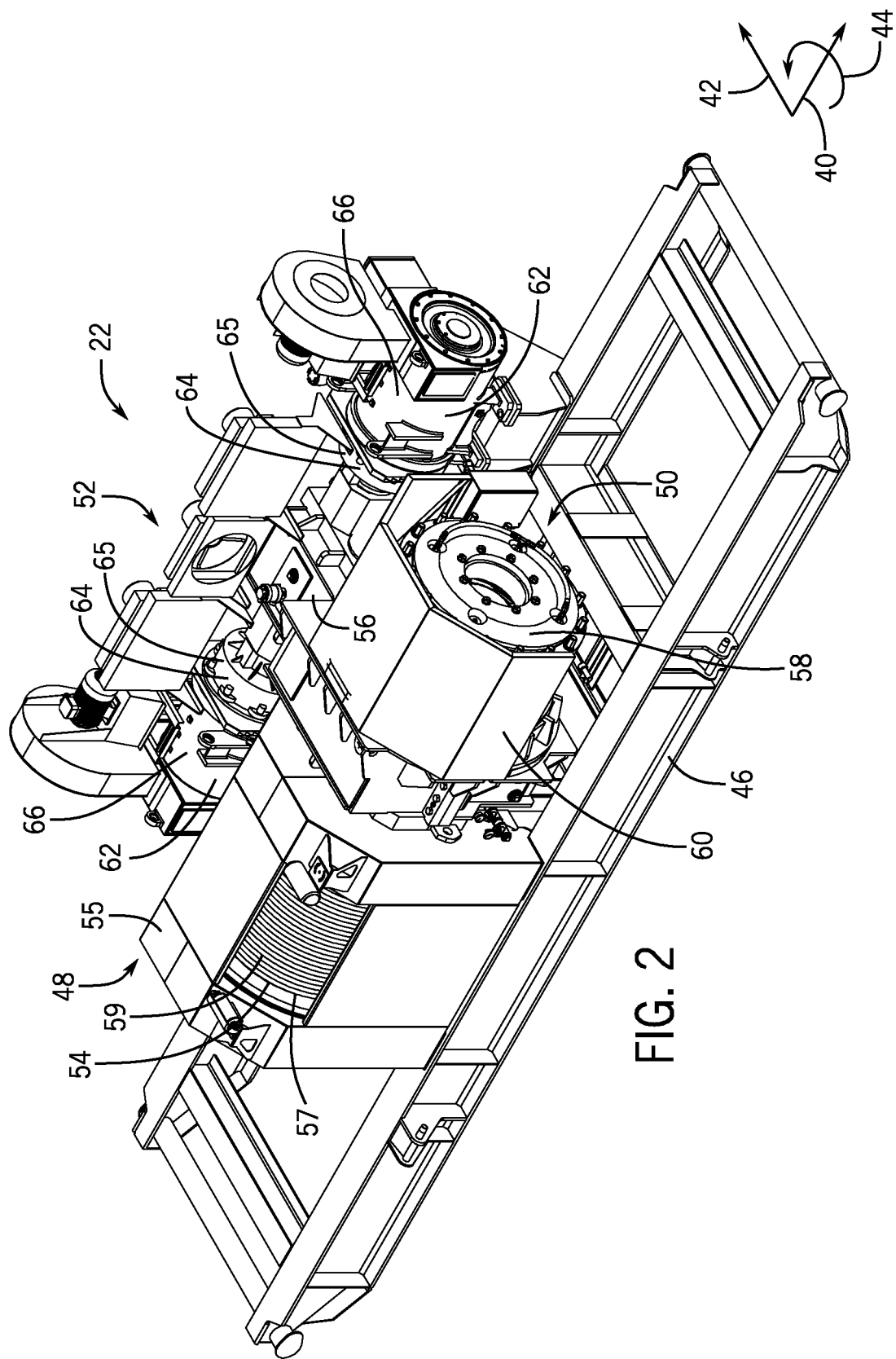
FIG. 2 is a perspective front view of a drawworks system that may be used in the drilling and production system of FIG. 1, in accordance with an embodiment of the present disclosure.

FIG. 2 is a perspective front view of the drawworks system 22 that may be used in the drilling and production system 10 of FIG. 1. To facilitate discussion, the drawworks system 22 and its components may be described with reference to an axial axis or direction 40, a lateral axis or direction 42 (or a radial axis or direction), and a circumferential axis or direction 44. In the illustrated embodiment, the drawworks system 22 includes a skid 46 (e.g., frame or support structure) that supports a drum assembly 48, a gearbox assembly 50, and a motor assembly 52.

In certain embodiments, the drum assembly 48 may include a drum 54 (e.g., annular drum) mounted on a drum shaft and positioned within a drum housing 55. As shown, an outer surface 57 (e.g., annular surface) of the drum 54 includes grooves 59 (e.g., circumferentially-extending grooves or Lebus grooves) that are configured to support a cable (e.g., the cable 24) that is wrapped circumferentially about the drum 54. In some embodiments, the drum 54 may have a diameter in a range of 90 to 150 centimeters (cm). In some embodiments, the drum 54 may have a diameter of between approximately 110 and 130, 115 and 125, or 118 and 120 cm.

In certain embodiments, the gearbox assembly 50 may include a gearbox 56 (e.g., dual input, parallel shaft, reduction gearbox, triple reduction, single speed, and/or single helical gearbox) and a brake 58 (e.g., pneumatic multi-disc brake or plate brake) supported within and/or coupled to (e.g., directly coupled via one or more fasteners) a gearbox housing 60 (e.g., frame or support structure supported by, coupled to, and/or in contact with the skid 46). Such a configuration may enable the gearbox housing 60 to transfer reaction torque from the brake 58 and/or output torque from the gearbox 56 to the skid 46, thereby providing a compact structure (e.g., the gearbox assembly 50 having the gearbox 56 and the brake 58 coupled to the gearbox housing 60) that effectively transfers forces to the skid 46. For example, the gearbox housing 60 may surround or cover the gearbox 56 (e.g., the shafts and gears of the gearbox 56), and the brake 58 may directly contact and may be directly coupled to the gearbox housing 60, such as via one or more fasteners. As discussed in more detail below, an output shaft of the gearbox 56 may be directly coupled (e.g., via splines) to the drum shaft to drive rotation of the drum shaft and the drum 54, and the brake 58 may be directly coupled (e.g., via splines) to the drum shaft to block rotation of the drum shaft and the drum 54.

In certain embodiments, the brake 58 may be configured to hold a hoisting load of the drawworks system 22. As discussed in more detail below, the brake 58 may be a fail-safe brake (e.g., spring applied and air released) that is biased toward a braked position and may be held in a non-braked position via an air supply. In certain embodiments, the brake 58 may be utilized for emergency or parking braking operations (e.g., only for emergency or parking braking operations, non-cyclical braking operations, or holding a suspended load), and the drawworks system 22 is configured to utilize regenerative braking for regular cyclical service braking during hoisting operations.

In certain embodiments, the motor assembly 52 may include one or more electric motors 62 (e.g., alternating current [AC] motors or direct current [DC] motors) supported within respective motor housings 66 and respective transmissions 64 (e.g., multi-speed planetary transmissions) supported within respective transmission housings 65. Each transmission 64 may be generally configured to adjust the power output of the respective motor 62. The illustrated embodiment includes two motors 62; however, it should be understood that any suitable number (e.g., 1, 2, 3, 4, or more) of motors 62 and/or respective transmissions 64 may be provided. As discussed in more detail below, respective drive shafts extending from the one or more motors 62 of the motor assembly 52 may be coupled (e.g., via crowned gear couplings) to an input shaft (e.g., double sided pinion shaft) of the gearbox 56.

In certain embodiments, each of the motors 62 may be configured to operate continuously at least equal to or greater than approximately 1150 horsepower (HP), and each of the motors 62 may be configured to operate intermittently at least equal to or greater than approximately 1500 HP (e.g., during hoisting operations or over a limited period of time, such as less than 10, 20, 30, 60, 90, 120, 180, or 300 minutes). Thus, during hoisting operations, the two motors 62 shown in FIG. 2 may together provide a total of at least equal to or greater than approximately 3000 HP. In some embodiments, each of the motors 62 may be configured to operate continuously between approximately 800-1800, 1000-1500, or 1100-1200 HP and/or intermittently between approximately 1200-2000, 1400-1800, or 1500-1600 HP. In certain embodiments, each of the respective transmissions 64 may be a two (a more) speed transmission (e.g., having a gear with a 1:1 gear ratio, a gear with a 2:1 gear ratio, and a neutral gear), and the respective transmissions 64 may enable the drawworks system 22 to hoist the load at a reduced speed using less than all of the motors 62 (e.g., upon failure of one of the two motors 62 shown in FIG. 2). For example, during normal operation of the drawworks system 22, each the respective transmissions 64 may be set to a 1:1 gear ratio and both of the motors 62 may drive rotation of the drum 54 via the gearbox 56 to move a load at a first speed. However, upon certain circumstances (e.g., if a first motor 62 fails), the respective transmission 64 coupled to the first motor 62 may be shifted to the neutral gear, and the respective transmission 64 coupled to a second motor 62 (e.g., intact motor) may be shifted to a 2:1 gear ratio to enable the drawworks system 22 to lift the load at approximately half of the first speed using only the second motor 62. The neutral gear may also enable the other motor (e.g., the second motor 62) to operate with a 1:1 gear ratio with reduced inertia (e.g., system inertia), thereby providing faster acceleration and/or deceleration in low load circumstances, for example.

As discussed in more detail below, in certain embodiments, the drawworks system 22 may include or be coupled to a control system (e.g., an electronic control system having an electronic controller having a processor and a memory) that is configured to receive and to process data from various sensors (e.g., a temperature sensor coupled to the brake 58, a speed sensor coupled to the motor 62, a speed sensor coupled to the drum shaft, a position or gear ratio sensor within the transmission 64, etc.) positioned about the drawworks system 22, to receive control signals and/or operator inputs, to provide an indication (e.g., a visual indication via a display and/or an audible indication via a speaker) of a condition of the drawworks system 22 (e.g., failure of the motor 62) to an operator, and/or to control components of the drawworks system 22 (e.g., move the brake 58 between the braked position and the non-braked position, shift gears of the transmissions 64, etc.) based on the data and/or the operator inputs, for example. In certain embodiments, the drawworks system 22 disclosed herein may utilize gaseous fluid (e.g., air or inert gas, such as nitrogen) in operation (e.g., to cool the motors 62, to operate the brake 58, etc.), and may not utilize liquid fluid (e.g., water) in operation.

Figure 3:
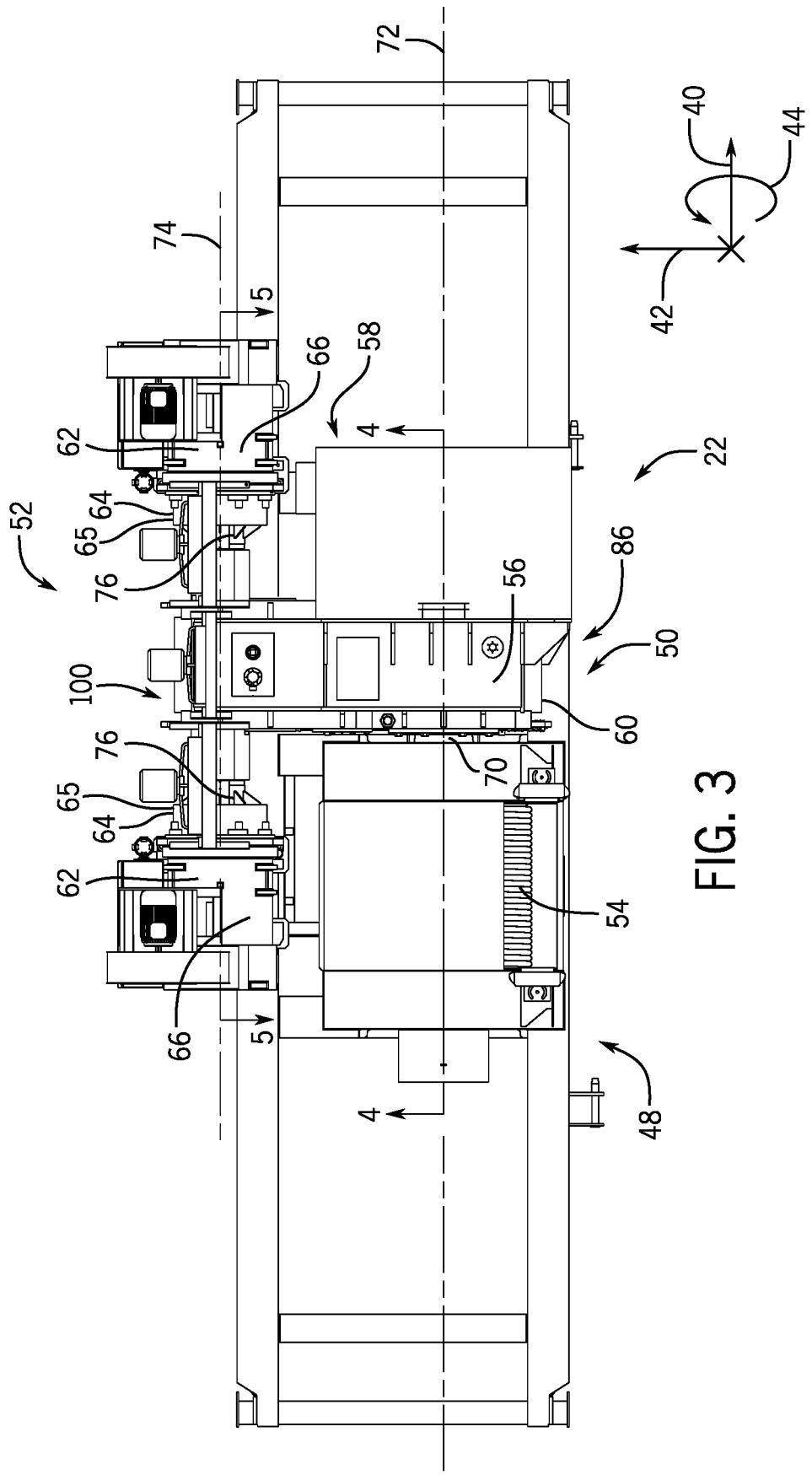
FIG. 3 is a top view of the drawworks system of FIG. 2.

FIG. 3 is a top view of the drawworks system 22. As shown, the drum assembly 48 includes the drum 54 positioned within the drum housing 55, and the drum 54 is mounted on a drum shaft 70 (e.g., non-rotatably mounted so as to rotate with the drum shaft 70) that extends in the axial direction 40 between the drum 54 and the gearbox 56 of the gearbox assembly 50. In the illustrated embodiment, the gearbox 56 and the brake 58 are supported by the gearbox housing 60 and are positioned on one side (e.g., the same side) of the drum 54 along the axial axis 40.

In the illustrated embodiment, the motor assembly 52 includes two motors 62 coupled to respective transmissions 64. As shown, each motor 62 is supported within a respective motor housing 66 and its respective transmission 64 is supported within a respective transmission housing 65. In certain embodiments, the motor assembly 52 (e.g., the one or more motors 62 and respective transmissions 64) may be positioned at a different location along the lateral axis 42 than the drum 54, the drum shaft 70, and/or the brake 58 (e.g., the motor assembly 52 may be separated from the drum 54, the drum shaft 70, and/or the brake 58 along the lateral axis 42). For example, in the illustrated embodiment, both motors 62 and their respective transmissions 64 are positioned rearward (e.g., along the lateral axis 42) of each of the drum 54, the drum shaft 70, and the brake 58. In the illustrated embodiment, one motor 62 is positioned on one side of the gearbox 56 and another motor 62 is positioned on another side (e.g., an opposite side) of the gearbox 56 along the axial axis 40.

In some embodiments, a rotational axis 72 of the drum 54 and the drum shaft 70 and a rotational axis 74 of drive shafts 76 (e.g., output shafts) of the motor assembly 52 may be generally parallel to one another and separated from one another along the lateral axis 42. In certain embodiments, the rotational axis 72 of the drum 54 and the drum shaft 70 is also the rotational axis of an output shaft 86 of the gearbox 56 and/or the brake 58. In the illustrated embodiment, the gearbox 56 extends along the lateral axis 42 to couple the motor assembly 52 to the drum assembly 48. In particular and as discussed in more detail below, an input shaft 100 of the gearbox 56 is positioned at a first location along the lateral axis 42 and is coupled to the drive shafts 76 of the motor assembly 52, and the output shaft 86 of the gearbox 56 is positioned at a second location along the lateral axis 42 and is coupled to the drum shaft 70. In certain embodiments, the input shaft 100 of the gearbox 56 is parallel to the output shaft 86 of the gearbox 56 (e.g., a parallel shaft gearbox 56).

Figure 4:
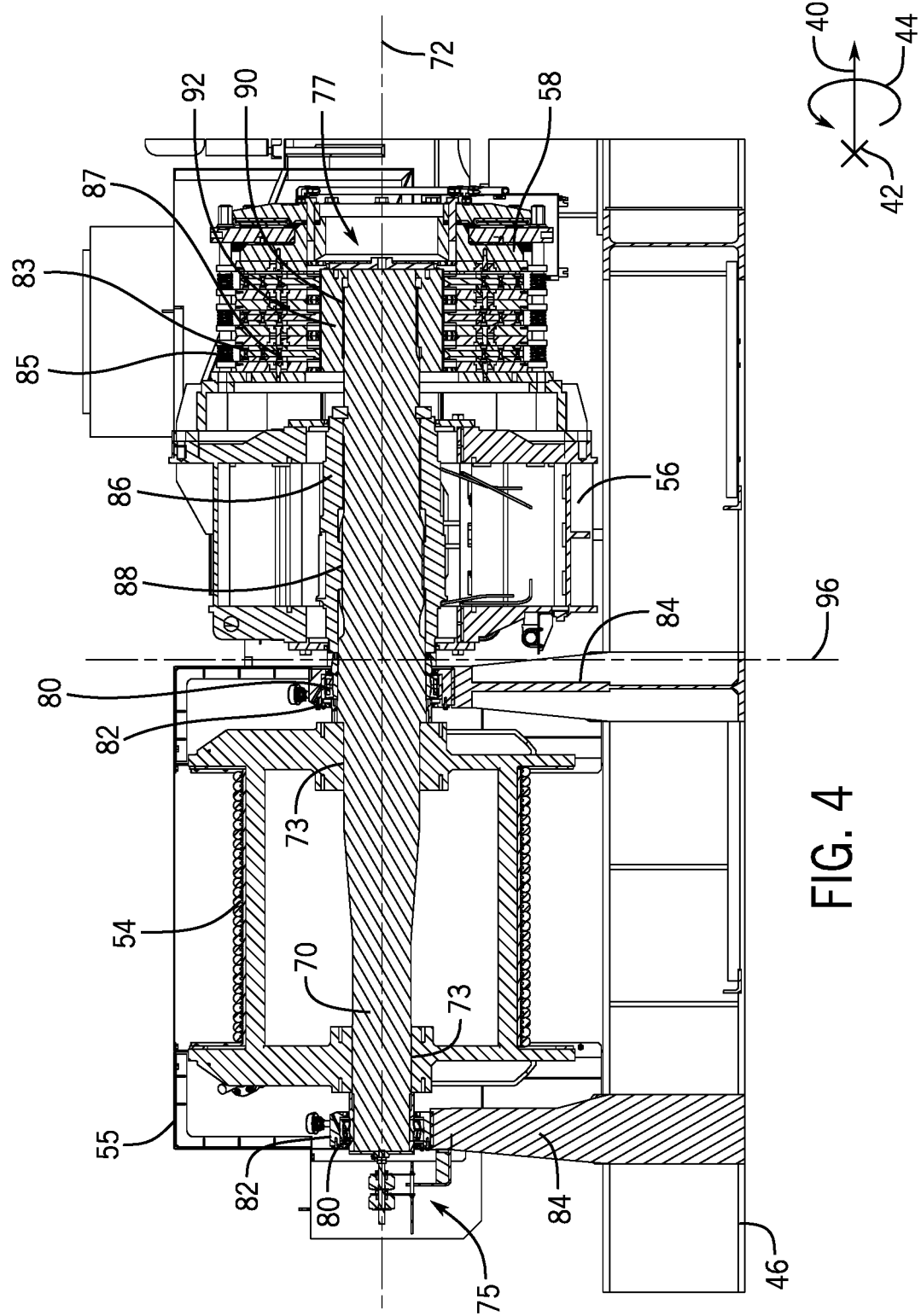
FIG. 4 is a cross-sectional side view of the drawworks system of FIG. 2, taken within lines 4-4 shown in FIG. 3.

FIG. 4 is a cross-sectional side view of the drawworks system 22, taken through the drum shaft 70 and within lines 4-4 shown in FIG. 3. As shown, the drum 54 is mounted (e.g., non-rotatably mounted via a splined interface 73, such as one or more male and female splines or mating teeth or grooves, so as to rotate with the drum shaft 70) to the drum shaft 70, which is rotatably supported above the skid 46 by bearings 80 within bearing housings 82. For example, in the illustrated embodiment, the bearing housings 82 are coupled to respective brackets 84 (e.g., frames) that are coupled to the skid 46.

In the illustrated embodiment, the drum shaft 70 is coupled to an output shaft 86 (e.g., annular or hollow shaft) of the gearbox 56, such as via a splined interface 88 (e.g., one or more male and female splines or mating teeth or grooves). Thus, rotation of the output shaft 86 drives rotation of the drum shaft 70 and the drum 54. In the illustrated embodiment, the drum shaft 70 is directly coupled to the brake 58, such as via a splined interface 90 between the drum shaft 70 and a hub 92 (e.g., annular or hollow shaft) of the brake 58. Thus, blocking rotation of the hub 92 of the brake 58 blocks rotation of the drum shaft 70 and the drum 54. As shown, the gearbox 56, the output shaft 86, and the brake 58 are positioned on one side (e.g., the same side) of the drum 54 along the axial axis 40, and the drum shaft 70 extends through the output shaft 86 of the gearbox 56 and into the hub 92 of the brake 58. Thus, the drum 54 is positioned on one side of the gearbox 56 and the brake 58 is positioned on another side (e.g., opposite side) of the gearbox 56 along the axial axis 40 (e.g., the gearbox 56 is positioned between the drum 54 and the brake 58 along the axial axis 40). As shown, the drum shaft 70, the output shaft 86, and the hub 92 of the brake 58 are aligned with one another and are configured to rotate about the rotational axis 72 (e.g., coaxial). In the illustrated embodiment, a first end 75 of the drum shaft 70 is supported by the respective bracket 84, and a second end 77 of the drum shaft 70 is positioned within the hub 92 of the brake 58. However, in some embodiments, the second end 77 of the drum shaft 70 may extend through the brake 58 and may be positioned on a side of the brake 58 opposite the gearbox 56 and the drum 54.

In some embodiments, the brake 58 may be a fail-safe brake that is biased toward a braked position in which the brake 58 blocks rotation the drum shaft 70 unless an air supply (e.g., via a pneumatic system) is provided to overcome the biasing force to hold the brake 58 in a non-braked position. For example, in certain embodiments, the brake 58 may include brake discs 83, biasing members 85, and radially-extending discs 87 coupled to the hub 92. In operation, the air supply may be provided to the brake 58 to overcome the biasing force of the biasing members 85 to separate the brake discs 83 from the radially-extending discs 87, thereby enabling rotation of the hub 92 and the drum shaft 70. When the air supply is removed, the biasing members 85 may urge the brake discs 83 into contact with the radially-extending discs 87, thereby blocking rotation of the hub 92 and the drum shaft 70. As noted above, the brake 58 may be utilized for emergency or parking braking operations (e.g., non-cyclical braking operations or holding a suspended load), and the drawworks system 22 is configured to utilize regenerative braking for regular cyclical service braking during hoisting operations. Although splined interfaces 73, 88, 90 are shown, these interfaces may have any suitable configuration to couple the components to one another, such as a key-slot interface, bushings, or the like. It should be understood that the brake 58 may be any suitable type of brake, including but not limited to a hydraulically-controlled brake or a plate-type brake (e.g., having a radially-extending disc supported on a hub coupled to the drum shaft 70 and calipers configured to engage the disc to block rotation of the drum shaft 70).

Figure 5:
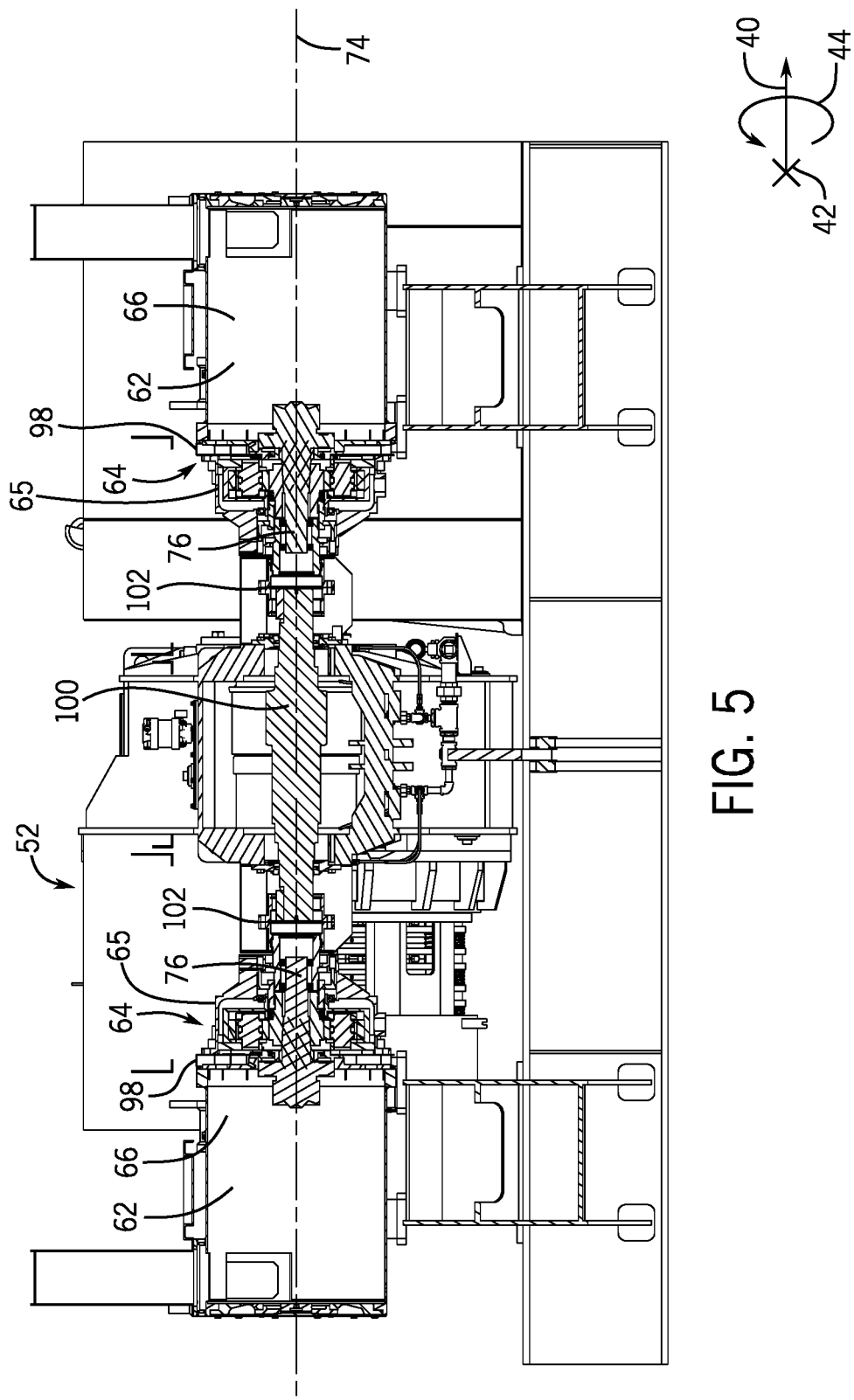
FIG. 5 is a cross-sectional side view of the drawworks system of FIG. 2, taken within lines 5-5 shown in FIG. 3.

FIG. 5 is a cross-sectional side view of the drawworks system 22, taken through an input shaft 100 (e.g., double-sided pinion input shaft) of the gearbox 56 and within lines 5-5 shown in FIG. 3. As shown, the input shaft 100 is coupled to respective drive shafts 76 of the motor assemblies 52 via respective gear couplings 102 (e.g., crowned gear couplings). In the illustrated embodiment, the motor assembly 52 includes two motors 62 within respective motor housings 66 and the two transmissions 64 within respective transmission housings 65.

In certain embodiments, the transmissions 64 may be multi-speed transmissions, such as a two-speed transmission configured to operate with a first gear ratio (e.g., 1:1 gear ratio), a second gear ratio (e.g., 2:1 gear ratio), and in neutral. Although examples provided herein relate to a two-speed transmission that provides a 1:1 gear ratio and a 2:1 gear ratio, it should be understood that the drawworks system 22 may include any of a variety of multi-speed transmissions providing any suitable number of gear ratios and/or any suitable gear ratio. In the illustrated embodiment, each transmission 64 is positioned between its respective motor 62 and the input shaft 100 of the gearbox 56 along the axial axis 40. As shown, each transmission housing 65 is coupled to the motor housing 66 via an adapter 98 (e.g., annular adapter, spacer, or support structure) positioned between the motor housing 66 and the transmission housing 65. As shown, the input shaft 100 and the drive shafts 76 are aligned with one another and are configured to rotate about the rotational axis 74 (e.g., coaxial).

Figure 6:
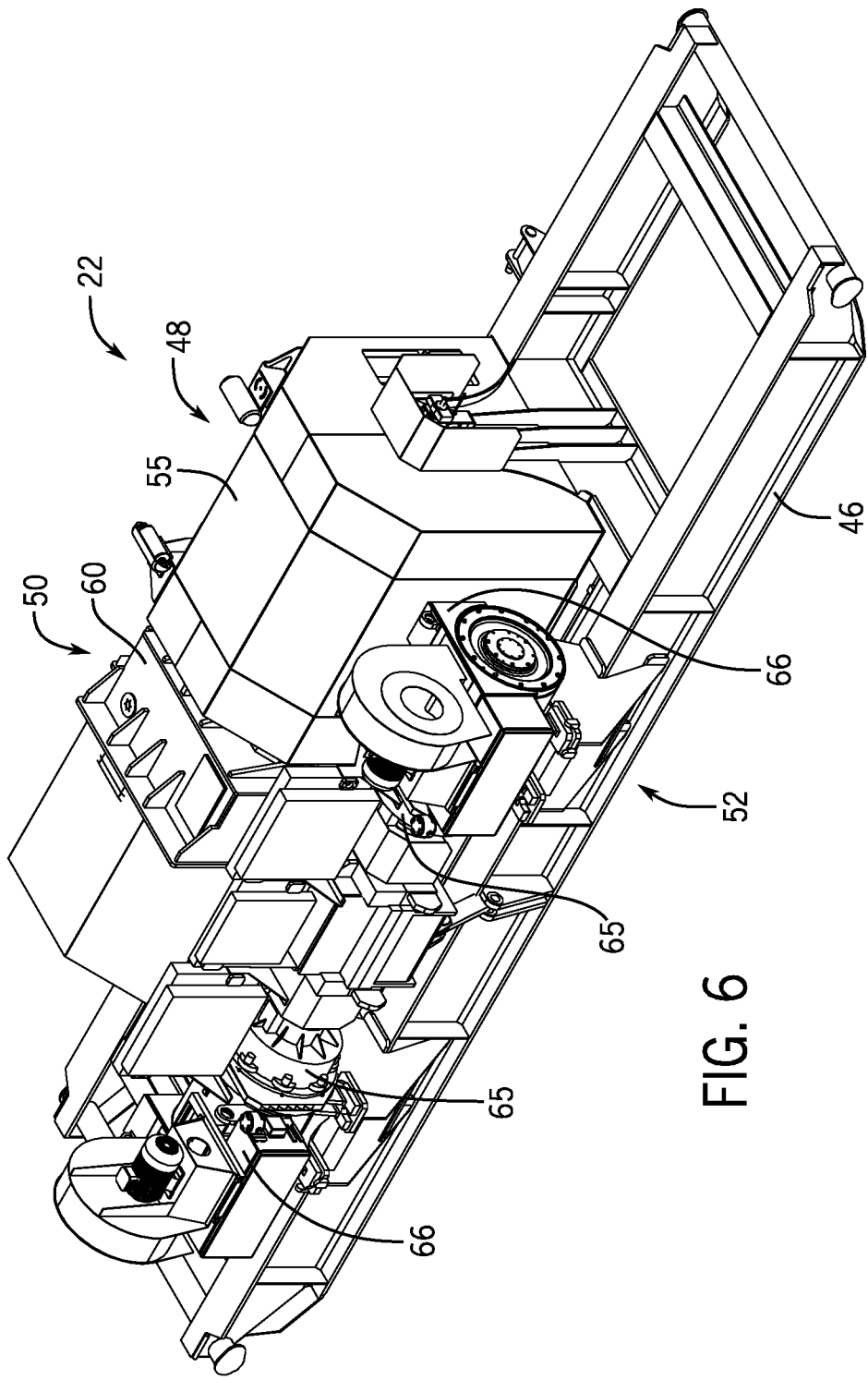
FIG. 6 is a perspective rear view of the drawworks system of FIG. 2.
Figure 7:
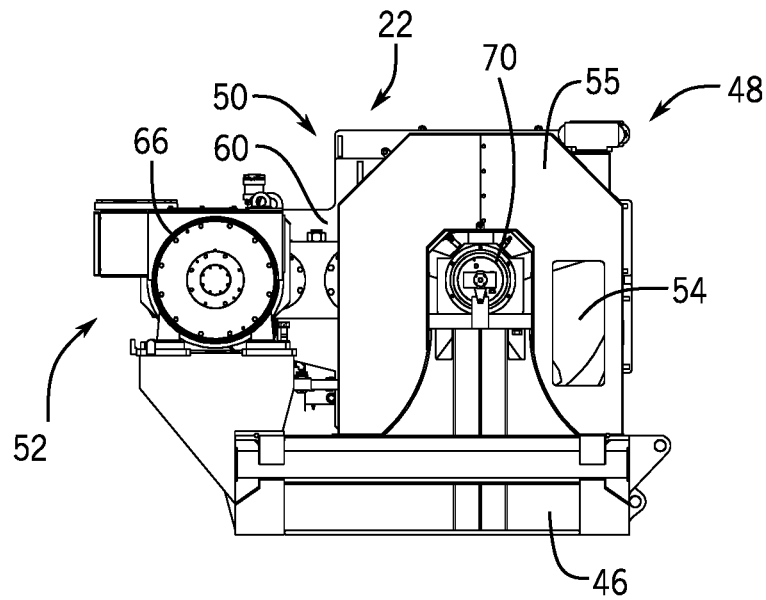
FIG. 7 is a left side view of the drawworks system of FIG. 2.
Figure 8:
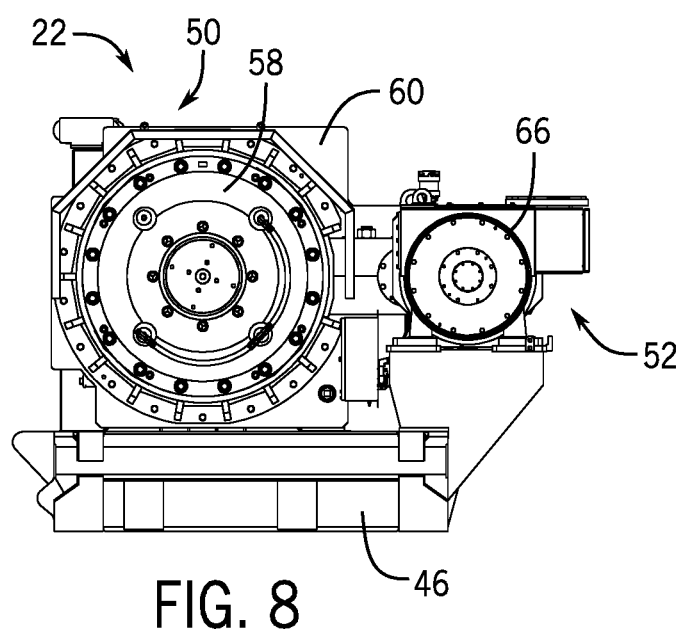
FIG. 8 is a right side view of the drawworks system of FIG. 2.
Figure 9:
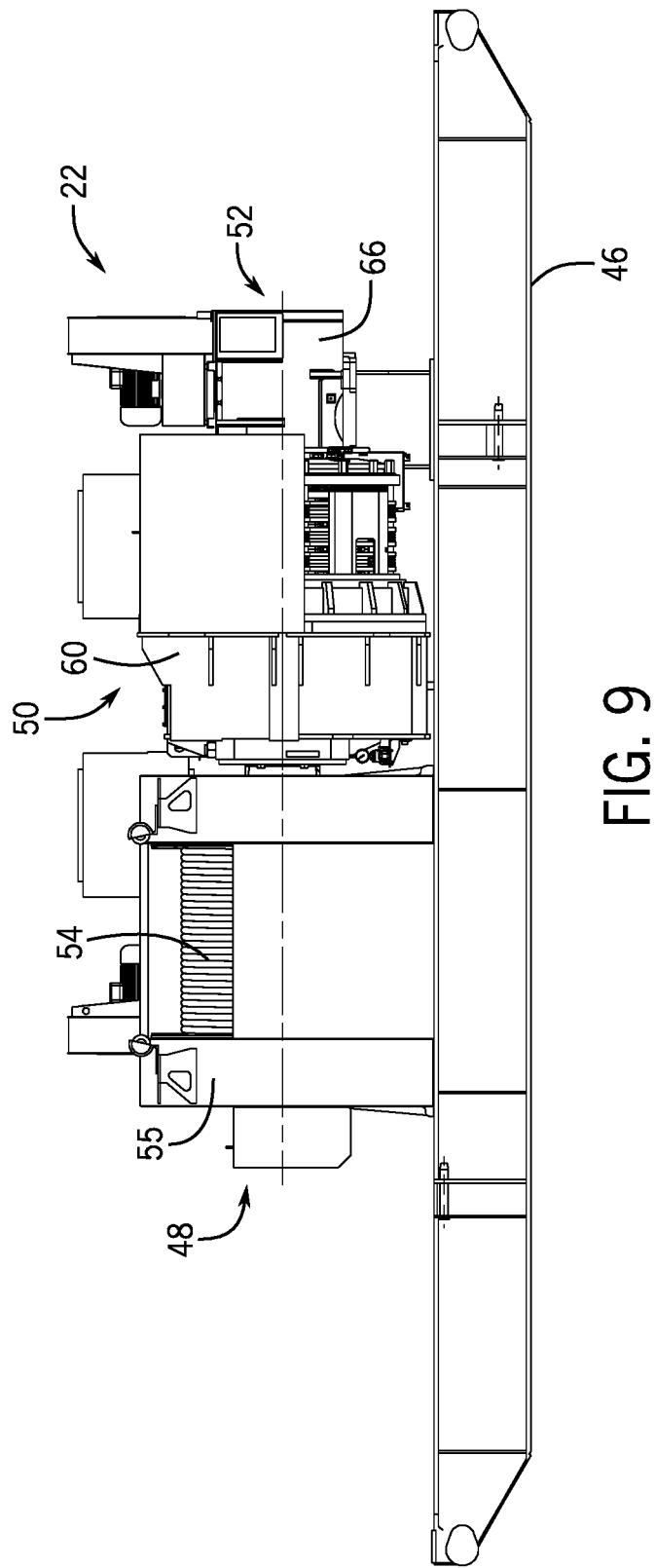
FIG. 9 is a front view of the drawworks system of FIG. 2.

Additional features of the drawworks system 22 are shown in FIGS. 6-9. For example, FIG. 6 is a perspective rear view of the drawworks system 22 and shows the skid 46, the drum housing 55 of the drum assembly 48, the gearbox housing 60 of the gearbox assembly 50, and the transmission housing 65 and the motor housing 66 of the motor assembly 52. FIG. 7 is a left side view of the drawworks system 22 and shows the skid 46, the drum shaft 70, the drum 54, and the drum housing 55 of the drum assembly 48. FIG. 7 also shows the gearbox housing 60 of the gearbox assembly 50 and the motor housing 66 of the motor assembly 52. FIG. 8 is a right side view of the drawworks system 22 and shows the skid 46, the brake 58 within the gearbox housing 60 of the gearbox assembly 50, as well as the motor housing 66 of the motor assembly 52. FIG. 9 is a front view of the drawworks system 22 and shows the skid 46, the drum 54 and the drum housing 55 of the drum assembly 48, the gearbox housing 60 of the gearbox assembly 50, and the motor housing 66 of the motor assembly 52.

Figure 10:
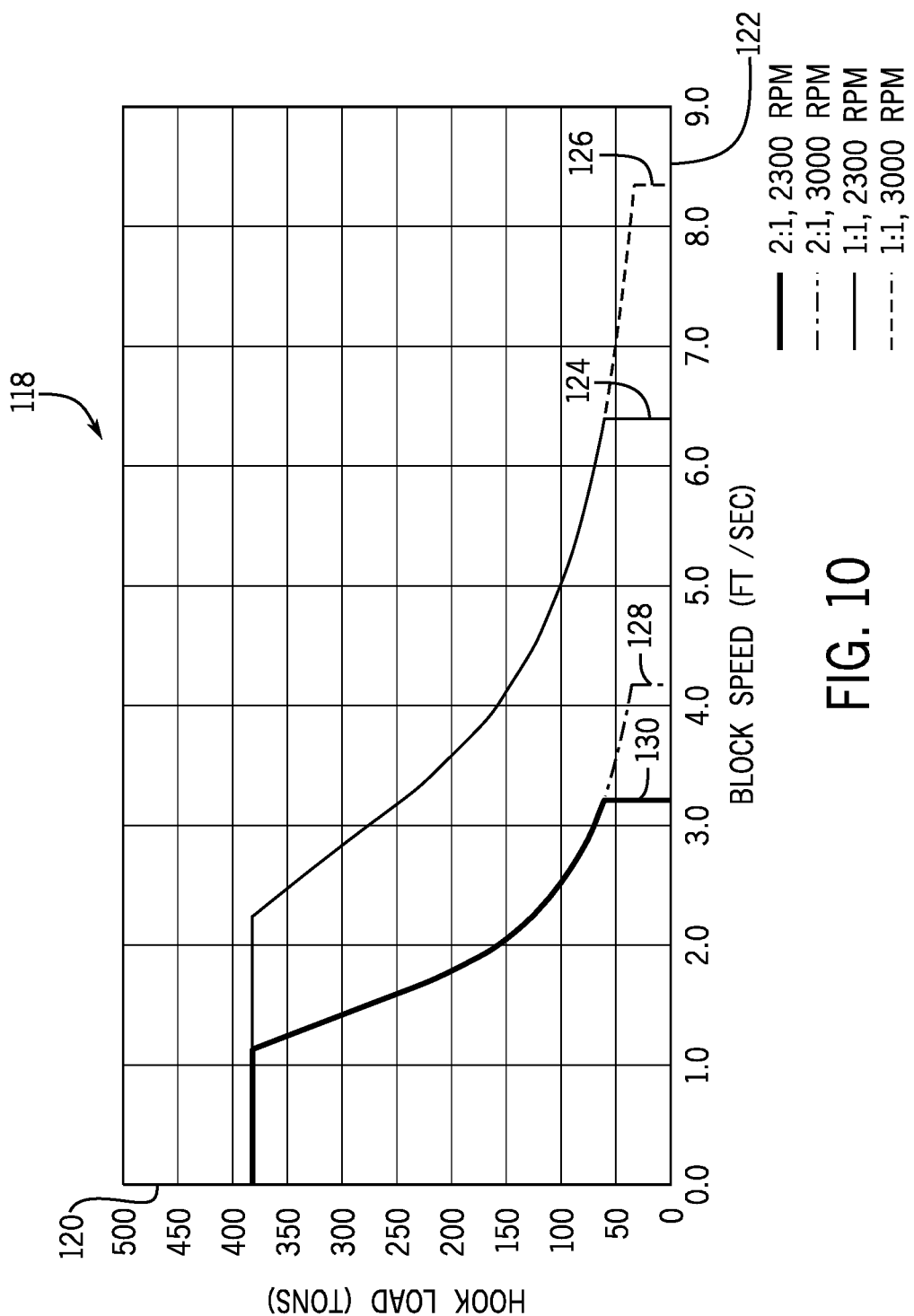
FIG. 10 is a graph illustrating hook load across block speed, in accordance with an embodiment of the present disclosure.

FIG. 10 is a graph 118 illustrating hook load 120 (e.g., load coupled to the traveling block 20 or load supported by the hoisting system 16) across block speed 122 (e.g., speed of the traveling block 20), in accordance with an embodiment of the present disclosure. As shown, in some embodiments, the drawworks system 22 may be configured to operate with a first maximum block speed, such as approximately 6.4 feet/second (ft/sec) (i.e., approximately 1.95 meters/second [m/s]) or between approximately 6 and 7 ft/sec (i.e., between approximately 1.8 and 2.2 m/s), with the two motors 62 operating at a first speed, such as a total of approximately 2300 revolutions per minute (RPM), and while each of the respective transmissions 64 are set to a first gear ratio (e.g., a 1:1 gear ratio) (line 124). In certain embodiments, the drawworks system 22 may be configured to operate at a second maximum speed, such as approximately 8.4 ft/sec (i.e., approximately 2.6 m/s) or between approximately 8 and 9 ft/sec (i.e., between approximately 2.4 and 2.8 m/s), with the two motors 62 operating at a second speed, such as a total of approximately 3000 RPM, and while the respective transmissions 64 are set to the first gear ratio (e.g., a 1:1 gear ratio) (line 126).

As noted above, the drawworks system 22 may be configured to move the hook load 120 at a reduced speed (e.g., approximately half speed) and/or at a reduced hook load 120 (e.g., approximately half hook load) at full speed using only a single motor 62. For example, as shown in the graph 118, the drawworks system 22 may be configured to operate at a third maximum speed, such as between approximately 4 and 5 ft/sec (i.e., between approximately 1.2 and 1.5 m/s), with a single motor 62 operating at the second speed, such as 3000 RPM, and while the respective transmission 64 is set to a second gear ratio (e.g., a 2:1 gear ratio) (line 128). In some embodiments, the drawworks system 22 may be configured to operate at a fourth maximum speed, such as between approximately 3 and 4 ft/sec (i.e., between approximately 0.9 and 1.2 m/s), with a single motor 62 operating at the first speed, such as 2300 RPM, and while the respective transmission 64 is set to the second gear ratio (e.g., a 2:1 gear ratio) (line 130). Various features, such as the diameter of the drum 54, the type of motors 62, the number of lines of the cable 24, a size and/or weight of the cable 24, the type of transmissions 64, the type of gearbox 56, and/or the arrangement and relative positioning of the components of the drum assembly 48, the gearbox assembly 50, and the motor assembly 52 may enable the drawworks system 22 to operate with the parameters illustrated in the graph 118 of FIG. 10. The disclosed configuration may enable the drawworks system 22 to provide the illustrated relatively high block speeds at relatively low motor speeds that enable efficient and adequate regenerative braking (e.g., using the motor assembly 52), thereby enabling the drawworks system 22 to raise and/or to lower the drilling equipment at the relatively high block speeds over a relatively greater distance or height of the wellbore 30 when using multiple motors 62. The disclosed embodiments also enable the drawworks system 22 to raise and/or to lower a load (e.g., a full load or a rated maximum load) at a reduced speed when using only a single motor 62 (e.g., the full load or the rated maximum load at approximately half speed as compared to using two motors 62). The disclosed embodiments may also result in reduced downtime (e.g., after failure of one motor 62) and/or efficient drilling operations, and/or may provide a compact drawworks system and/or may facilitate maintenance and/or repair of the components of the drawworks system 22, for example.

Figure 11:
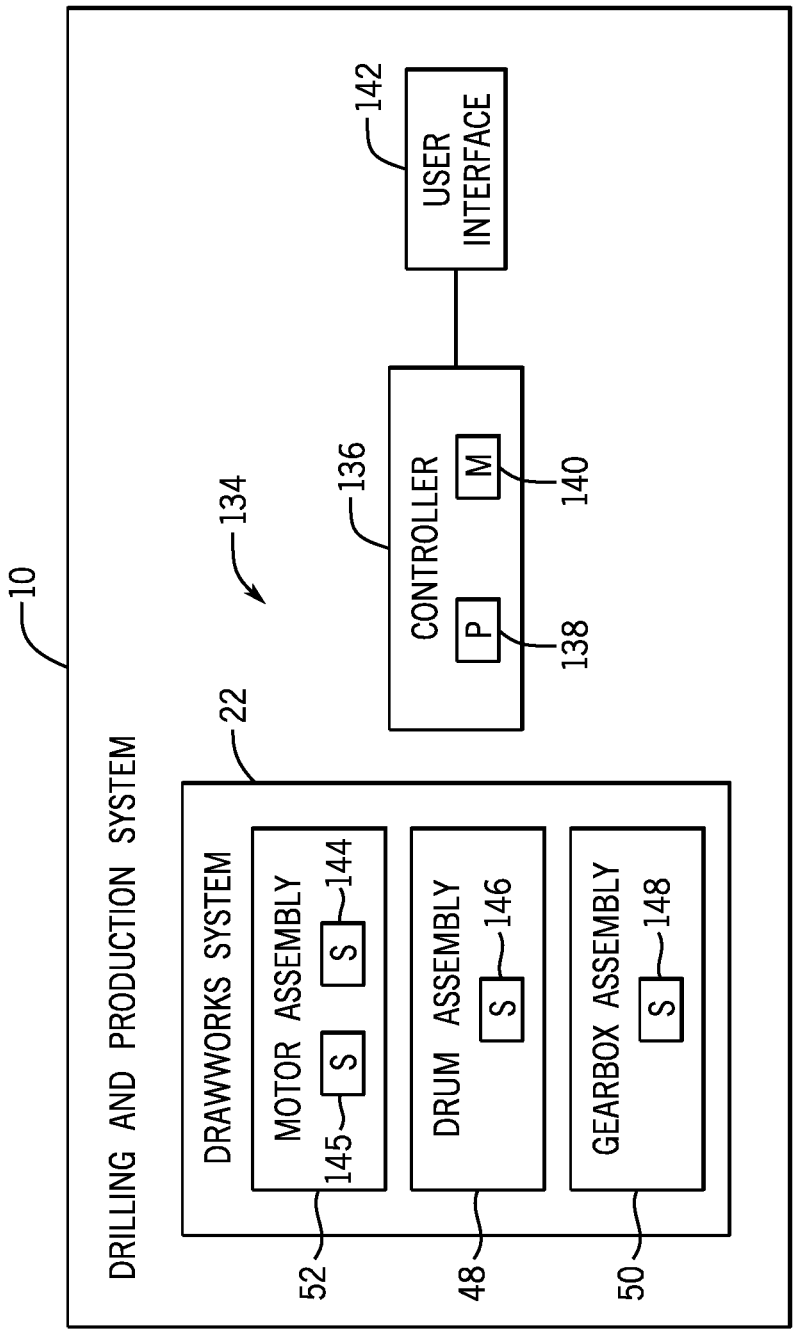
FIG. 11 is a schematic diagram of an embodiment of a control system that may be used in the drilling and production system of FIG. 1.

FIG. 11 is a schematic diagram of an embodiment of a control system 134 that may be utilized within the drilling and production system 10 of FIG. 1. As shown, the control system 134 includes a controller 136 (e.g., electronic controller) having a processor 138, a memory 140, and a user interface 142. The user interface 142 may be configured to receive an operator input and/or to provide an indication, such as a visual indication on a display and/or an audible indication via a speaker. The control system 134 may include one or more sensors, such as a sensor 144 configured to monitor a speed of a respective motor 62, a sensor 145 configured to monitor a gear ratio of the transmission 64 (e.g., by measuring a position of one or more components within the transmission 64), a sensor 146 configured to monitor a speed of the drum shaft 70, a sensor 148 configured to monitor a temperature within the brake 58, or the like. The sensors 144, 145, 146, 148 may provide signals indicative of a condition of the drawworks system 22 to the processor 138 to enable the processor 138 to provide an indication via the user interface 142 and/or to control various components of the drawworks system 22. For example, in some embodiments, the sensor 144 may provide a signal that enables the processor 138 to determine that the motor 62 is not functioning properly (e.g., has failed). In certain embodiments, the processor 138 may provide an audible indication and/or instruct a display to provide a visual indication of the condition of the drawworks system 22 to the operator, thereby enabling the operator to take appropriate action, provide appropriate inputs, or the like. In certain embodiments, upon determination of motor failure, the processor 138 may automatically control a valve to adjust (e.g., remove) the air supply that holds the brake 58 in the non-braked position, thereby causing the brake 58 to move to the braked position and to block rotation of the drum shaft 70. Indeed, various steps and processes disclosed herein with respect to the hoisting operations may be conducted via operator inputs and/or may be conducted automatically by the processor 138 in response to the condition of the drawworks system 22.

In the illustrated embodiment, the controller 136 includes the processor 138 and the memory 140. The controller 136 may also include one or more storage devices and/or other suitable components. The processor 138 may be used to execute software, such as software for controlling the drawworks system 22. Moreover, the processor 138 may include multiple microprocessors, one or more "general-purpose" microprocessors, one or more special-purpose microprocessors, and/or one or more Application Specific Integrated Circuits (ASIC), or some combination thereof. For example, the processor 138 may include one or more Reduced Instruction Set (RISC) or Complex Instruction Set (CISC) processors. The memory 140 may include a volatile memory, such as Random Access Memory (RAM), and/or a nonvolatile memory, such as Read Only Memory (ROM). The memory 140 may store a variety of information and may be used for various purposes. For example, the memory 140 may store processor-executable instructions (e.g., firmware or software) for the processor 138 to execute, such as instructions for controlling the drawworks system 22, processing signals from the sensors 144, 145, 146, 148, and/or providing indications via the user interface 142. The storage device(s) (e.g., nonvolatile storage) may include read-only memory (ROM), flash memory, a hard drive, or any other suitable optical, magnetic, or solid-state storage medium, or a combination thereof. The storage device(s) may store data (e.g., condition data, thresholds, or the like), instructions (e.g., software or firmware for controlling the drawworks system 22, or the like), and any other suitable data. Although the control system 134 is illustrated with one controller 136 to facilitate discussion, it should be understood that the control system 134 may be a distributed control system having multiple controllers 136 and may be configured to carry out various other functions.

Figure 12:
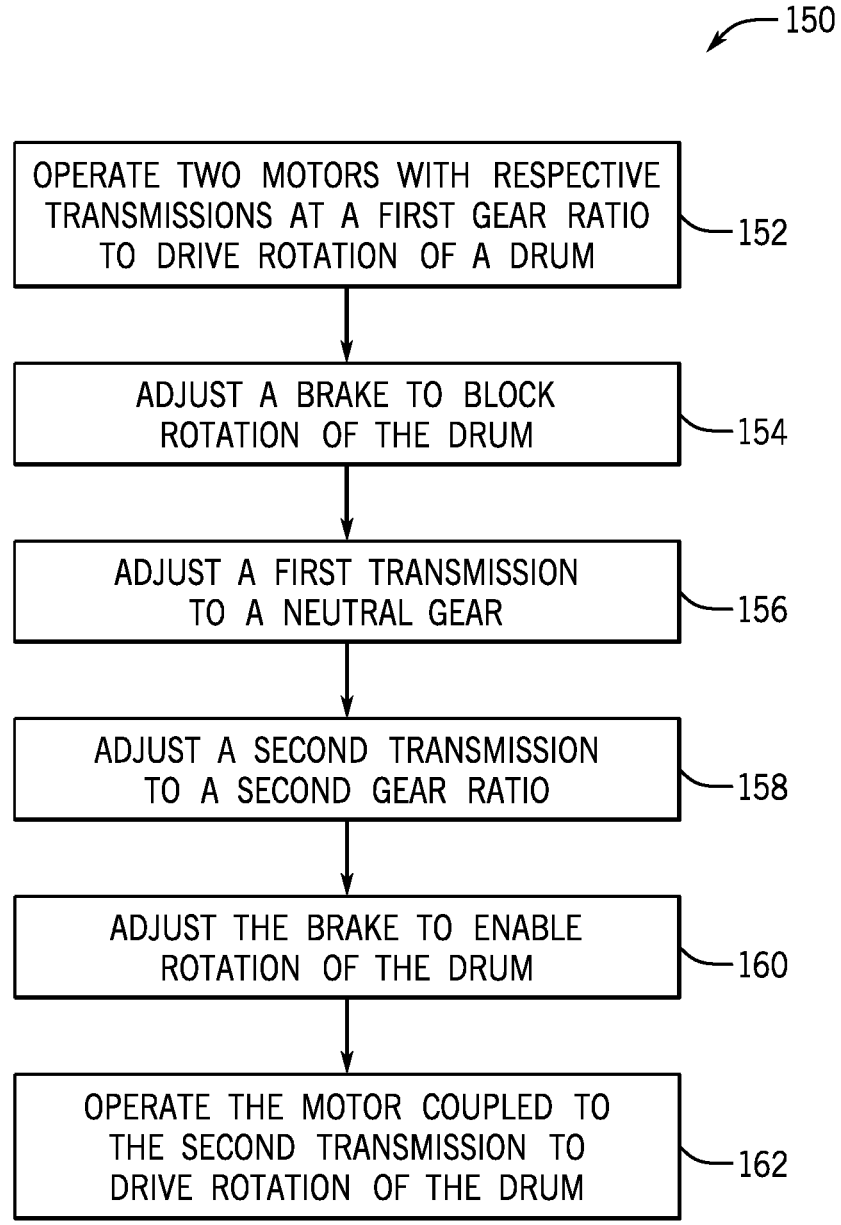
FIG. 12 is a flow diagram of a method of operating a drawworks system, in accordance with an embodiment of the present disclosure.

FIG. 12 is a flow diagram of an embodiment of a method 150 of operating the drawworks system 22. The method 150 includes various steps represented by blocks. Although the flow diagram illustrates the steps in a certain sequence, it should be understood that the steps may be performed in any suitable order, certain steps may be carried out simultaneously, and/or certain steps may be omitted, where appropriate. Certain steps of the method 150 may be performed by an operator via manual operation of an actuator, via an input into a control system (e.g., an electronic control system having an electronic controller having a processor and a memory device, such as the control system 134), or the like. Additionally or alternatively, certain steps of the method 150 may be performed as an automated procedures (e.g., by an electronic control system, such as the electronic control system 134).

With the foregoing in mind, the method 150 may begin by operating the motors 62 of the drawworks system 22 at a designated power and with the respective transmissions at a first gear ratio (e.g., 1:1 gear ratio) to drive rotation of the drum 54 via the gearbox 56 and to move a load at a first speed, in step 152. In step 154, the brake 58 may be applied to block rotation of the drum 54. As discussed above, in certain embodiments, an operator may provide an input (e.g., via the user interface 142 of the controller 136) to control a pneumatic system to remove the air supply to enable the brake 58 to block rotation of the drum 54. In some embodiments, the controller (e.g., the controller 136) may apply the brake 58 automatically in response to data received from one or more sensors (e.g., sensors 144). In certain embodiments, the brake 58 may be applied in response to an indication of a failed motor 62 (e.g., failure of one motor 62 of the multiple motors 62) during a hoisting operation, for example.

In step 156, while the brake 58 is in the braked position and the drum 54 is stationary, a first transmission 64 coupled to a first motor 62 (e.g., a failed motor) may be switched to a neutral position. In step 158, a second transmission 64 coupled to a second motor 62 (e.g., an intact motor) may be switched from the first gear ratio to a second gear ratio (e.g., 2:1 gear ratio) to enable the drawworks system 22 to carry the load at a reduced speed (e.g., at approximately half of the first speed) with the second motor 62. The transmission gear ratios may be adjusted via an operator input (e.g., via the user interface 142 of the controller 136) or automatically by the controller 136 in response to various signals, such as a signal from the sensor 146 that indicates the drum shaft 70 is stationary and/or other signals that indicate the brake 58 is adequately applied, for example.

In step 160, the brake 58 may be returned to the non-braked position (e.g., via control of the pneumatic system to provide the air supply via an operator input or automatically via the controller 136) to enable rotation of the drum 154. In step 162, the second motor 62 that is coupled to the second transmission 64 that is set at the second gear ratio may be operated at the designated power to move the load (e.g., at approximately half of the first speed). Such a configuration may reduce downtime, increase the efficiency of certain drilling operations (e.g., by enabling completion of certain drilling operations), and/or may enable delay of repair to the first motor 62 until a more convenient time, for example.

Figure 13:
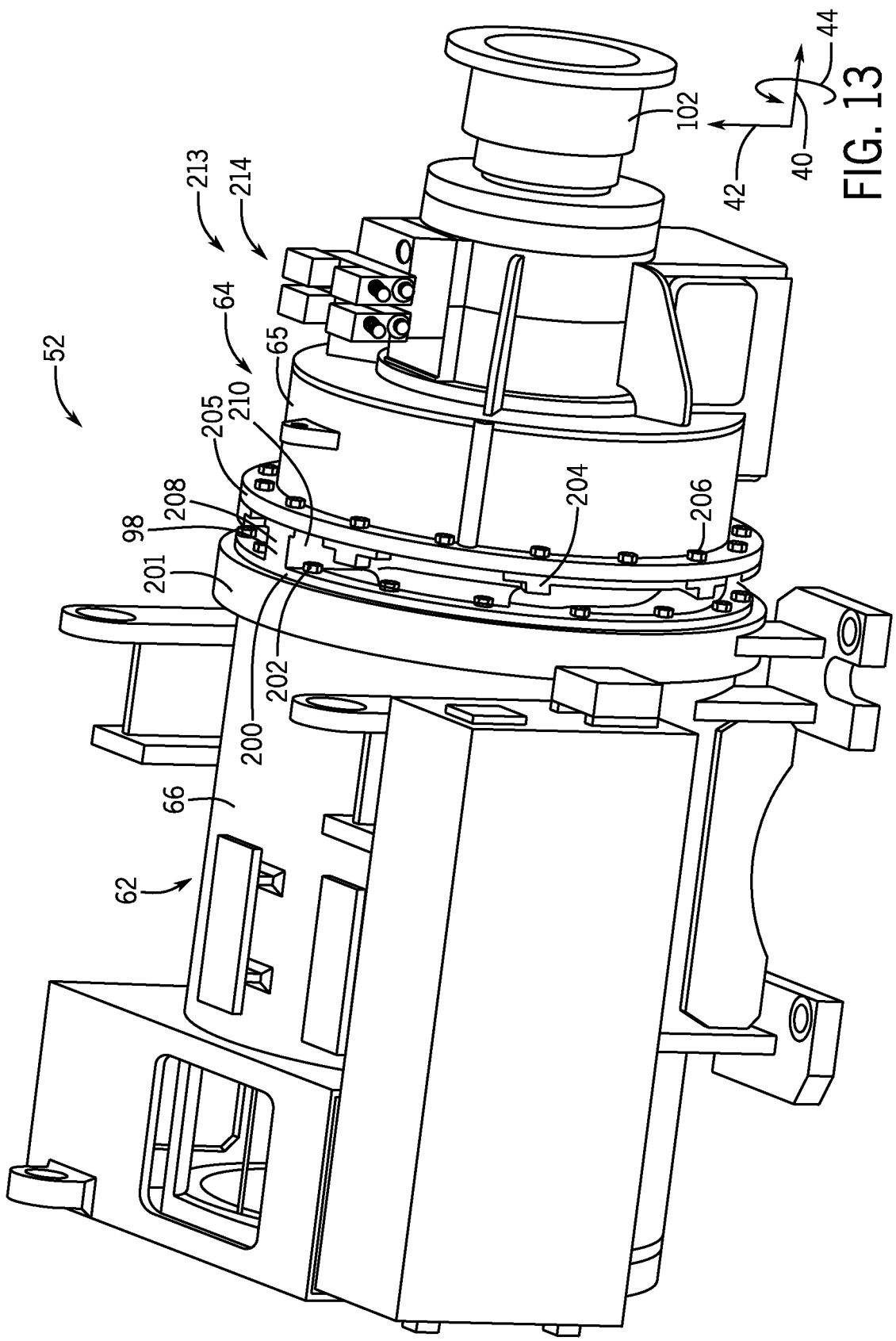
FIG. 13 is a perspective view of an embodiment of a motor assembly that may be used in the drawworks system of FIG. 2.
Figure 14:
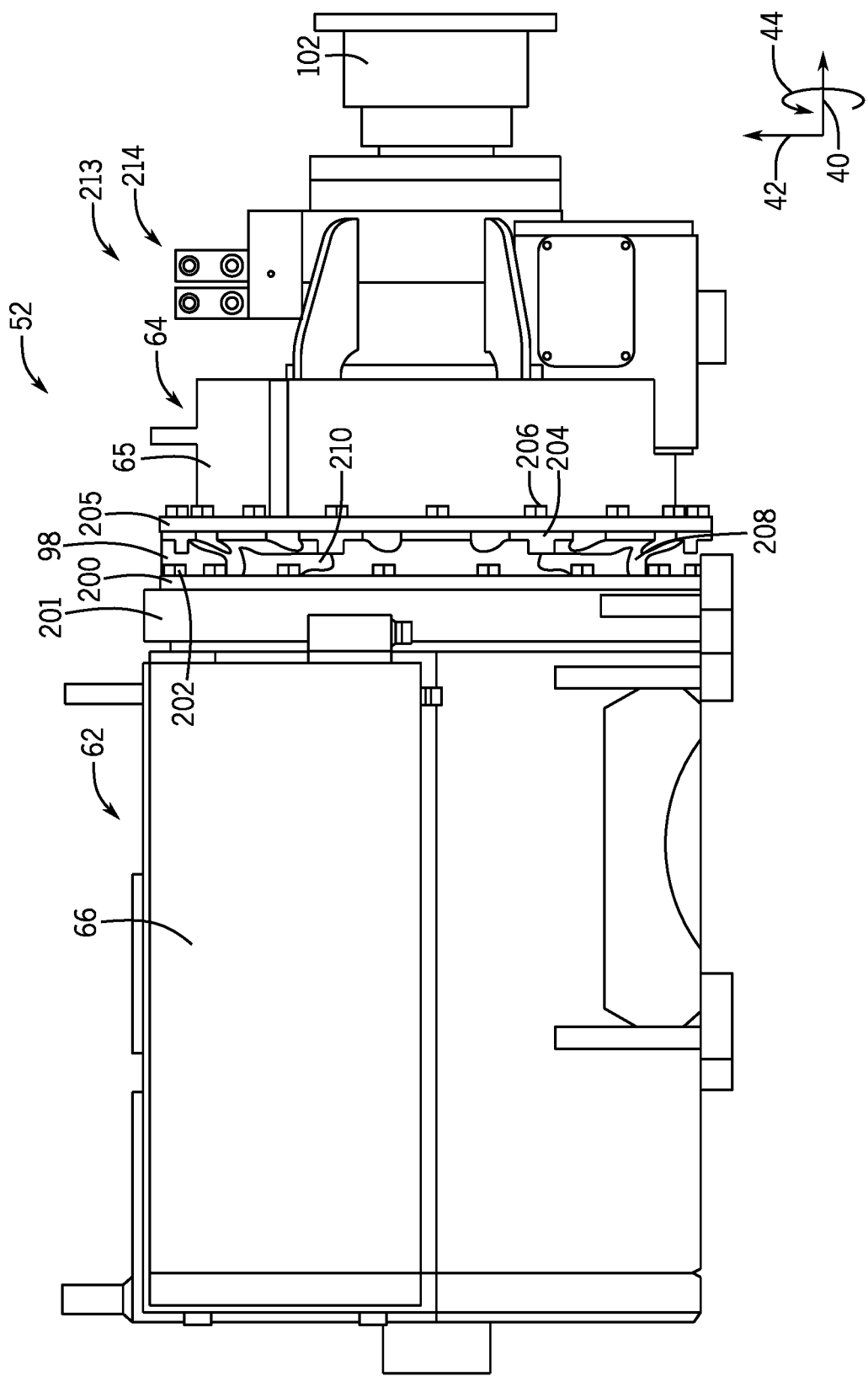
FIG. 14 is a side of the motor assembly of FIG. 13.

It should be understood that the various components of the drawworks system 22 may have various configurations. For example, FIGS. 13-21 illustrate an embodiment of a portion of the motor assembly 52 that may be utilized within the drawworks system 22. In particular, FIG. 13 is a perspective view and FIG. 14 is a side view of an embodiment of a portion of the motor assembly 52 having one motor 62 positioned within the motor housing 66 and a respective transmission 64 positioned within the transmission housing 65. In the illustrated embodiment, the adapter 98 is positioned between the motor housing 66 and the transmission housing 65 along the axial axis 40. As shown, the adapter 98 includes a first flange 200 (e.g., annular flange) configured to be coupled to a corresponding flange 201 (e.g., annular flange) of the motor housing 66 via one or more fasteners 202 (e.g., threaded fasteners, such as bolts) and a second flange 204 (e.g., annular flange) configured to be coupled to a corresponding flange 205 (e.g., annular flange) of the transmission housing 65 via one or more fasteners 206 (e.g., threaded fasteners, such as bolts). The adapter 98 may include one or more axially-extending portions 208 that extend axially between and couple the first flange 200 and the second flange 204 to one another and one or more openings 210 (e.g., vents) positioned axially between the first flange 200 and the second flange 204 and circumferentially between adjacent axially-extending portions 208 to provide air flow about the motor 62 and/or to vent exhaust from the motor 62, for example. As shown, the gear coupling 102 is provided to couple the drive shaft of the motor assembly 52 to another component, such as the input shaft of the gearbox 56. As discussed in more detail below, the motor assembly 52 may include a fluid drive system 213 (e.g., actuator system) configured to control one or more valves 214 (e.g., shift valves) to adjust a flow of fluid (e.g., pressurized liquid or gas) to adjust the gear ratio of the transmission 64.

Figure 15:
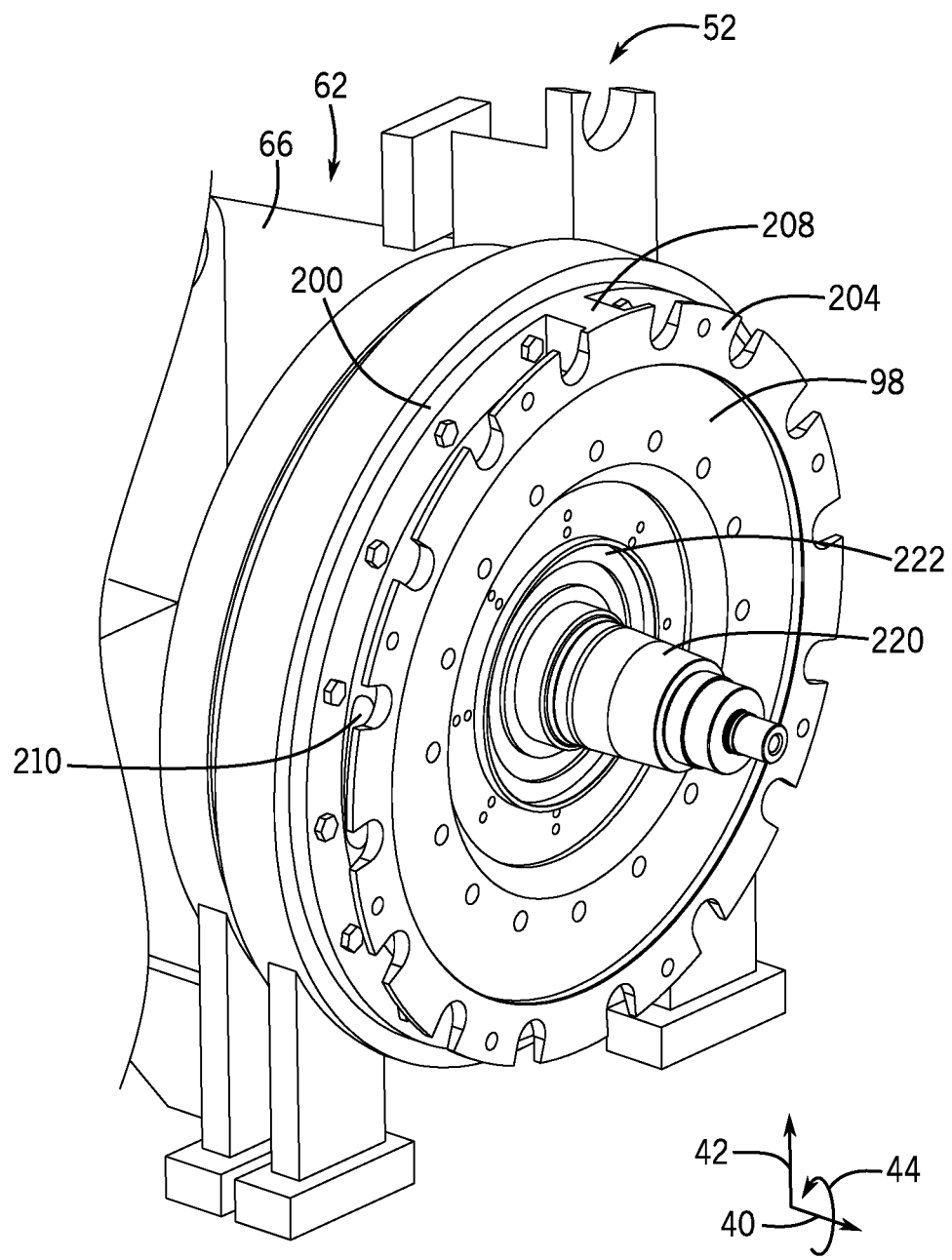
FIG. 15 is a perspective view an embodiment of an adapter that may be used within the motor assembly of FIG. 13.

FIG. 15 is a perspective view of an embodiment of the adapter 98 coupled to the motor housing 66. As shown, a motor shaft 220 extends axially through a central opening 222 of the adapter 98. In the illustrated embodiment, the adapter 98 includes the first flange 200, the second flange 204, the one or more axially-extending portions 208, and the one or more openings 210. The adapter 98 may enable the motor housing 66 and the transmission housing 65 to be coupled to one another, thereby enabling adjustment of the power output of the motor 62 and providing a compact motor assembly 52 for use within the drawworks system 22.

As discussed above, in certain embodiments, the transmission 64 may be a multi-speed transmission (e.g., two-speed transmission configured to operate with a 1:1 gear ratio, a 2:1 gear ratio, and in neutral). Such a configuration may enable the drawworks system 22 to hoist the load at a reduced speed using less than all of the motors 62 (e.g., upon failure of one of the two motors 62 shown in FIG. 2). For example, during normal operation of the drawworks system 22, each of the respective transmissions 64 may be set to a first gear ratio (e.g., a 1:1 gear ratio) and both of the motors 62 may drive rotation of the drum 54 via the gearbox 56 to move a load at a first speed. However, upon certain circumstances (e.g., if a first motor 62 fails), the respective transmission 64 coupled to the first motor 62 may be shifted to the neutral gear, and the respective transmission 64 coupled to a second motor 62 (e.g., intact motor) may be shifted to a second gear ratio (e.g., a 2:1 gear ratio) to enable the drawworks system 22 to lift the load at a reduced speed (e.g., approximately half of the first speed) using only the second motor 62.

Figure 16:
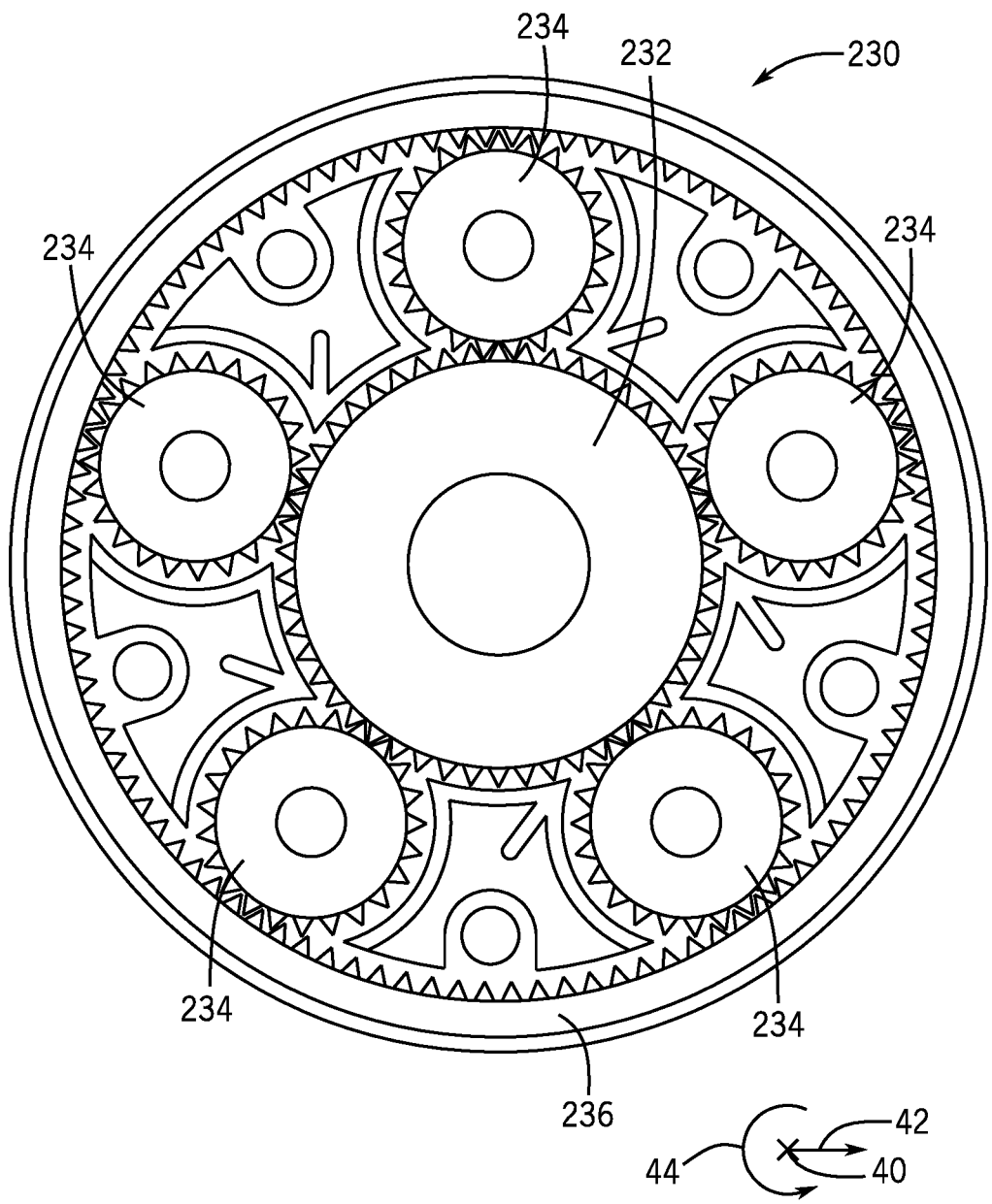
FIG. 16 is a schematic diagram of an embodiment of a planetary gearset that may be used within the motor assembly of FIG. 13.

With the foregoing in mind, FIG. 16 is a schematic diagram of an embodiment of a gearset 230 (e.g., planetary gearset) that may be utilized within the transmission 64 of the motor assembly 52. In the illustrated embodiment, the gearset 230 is a five-planet epicyclic gearset with a sun gear 232, planet gears 234, and a ring gear 236. In some embodiments, the gearset 230 may be configured to provide a reduction ratio of greater than or equal to 2:1 (e.g., 2:1, 3:1, 4:1, 5:1, 10:1, or the like).

Figure 17:
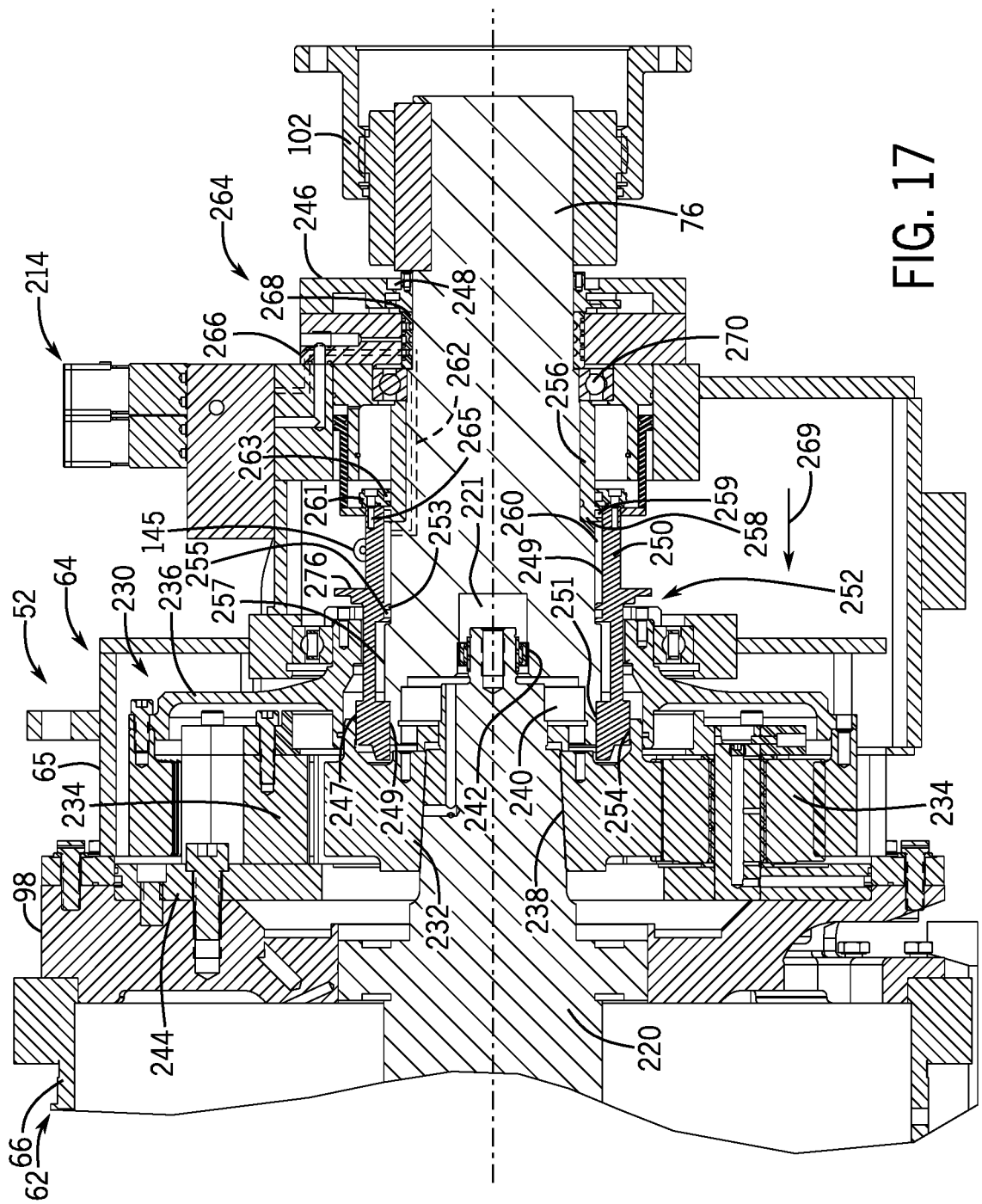
FIG. 17 is a cross-sectional side view of an embodiment of a transmission that may be used within the motor assembly of FIG. 13, wherein an annular sleeve of the transmission is in an extended position.

FIG. 17 is a cross-sectional side view of a portion of the transmission 64 that may be utilized in the motor assembly 52 of the drawworks system 22. As shown, the transmission 64 is positioned within the transmission housing 65, which may be coupled to the motor housing 66 via the adapter 98. The motor shaft 220 driven by the motor 62 extends from motor housing 66, through the adapter 98, and into a cavity 221 at one end of the drive shaft 76. The motor shaft 220 is coupled to the sun gear 232 (e.g., non-rotatably coupled to rotate with the sun gear 232), such as via a splined interface 238 (e.g., one or more male and female splines or mating teeth or grooves), and is coupled (e.g., rotatably coupled) to the drive shaft 76 via bearings, such as a first bearing 240 (e.g., cylindrical bearing) and/or a second bearing 242 (e.g., needle bearing). The gear coupling 102 is provided to couple the drive shaft 76 of the motor assembly 52 to another component, such as the input shaft of the gearbox 56.

As shown, the transmission 64 includes the gearset 230 having the sun gear 232, the planet gears 234 supported by a planet gear carrier 244, and the ring gear 236. The transmission 64 includes a sleeve 250 (e.g., annular shift sleeve, piston, or cylinder that may be driven by fluid) that circumferentially surrounds at least a portion of the drive shaft 76. In the illustrated embodiment, a radially-inner surface 249 (e.g., radially-inner wall, annular surface, internal splined surface) of the sleeve 250 is coupled (e.g., non-rotatably coupled via a splined interface 251) to the drive shaft 76 and is configured to move along the axial axis 40 relative to the gearset 230, the transmission housing 65, and/or the drive shaft 76. When the sleeve 250 is in the illustrated first position 252 (e.g., extended position), a radially-outer surface 247 (e.g., radially-outer wall, annular surface, external splined surface) of the sleeve 250 engages the sun gear 232 (e.g., non-rotatably engages the sun gear 232 via a splined interface 254), and thus, the transmission 64 provides the 1:1 gear ratio and the drive shaft 76 rotates with the motor shaft 220.

As shown, the sleeve 250 includes a protrusion 253 (e.g., annular protrusion or flange) that extends radially inward from the sleeve 250 and which may support a seal 255 (e.g., annular seal) that seals against an outer wall 257 (e.g., radially-outer wall or annular surface) of the drive shaft 76. In the illustrated embodiment, a support sleeve 256 (e.g., annular sleeve) is coupled (e.g., non-rotatably coupled, such as via one or more fasteners or threaded interfaces) to the outer wall 257 of the drive shaft 76 (e.g., the support sleeve 256 does not move relative to the drive shaft 76). The support sleeve 256 may include a protrusion 258 (e.g., annular protrusion or flange), which may support a seal 259 (e.g., annular seal) that seals against the inner wall 249 of the sleeve 250. While shown as a physically separate component in FIG. 17, it should be understood that the support sleeve 256 may be integrally formed with the drive shaft 76, in some embodiments. As shown, a support ring 261 (e.g., annular ring) is coupled (e.g., non-rotatably coupled, such as via one or more fasteners or threaded interfaces) to the sleeve 50 and may support a seal 263 (e.g., annular seal) that seals against the support sleeve 256. In the illustrated embodiment, the support ring 261 is coupled to the sleeve 250 via a fastener 265 (e.g., threaded fastener); however, it should be understood that the support ring 261 may be coupled to the sleeve 250 via any suitable technique or may be integrally formed with the sleeve 250 (e.g., one piece).

In the illustrated embodiment, an extension cavity 260 (e.g., annular cavity or sealed cavity) is defined between the inner wall 249 of the sleeve 250 and the outer wall 257 of the drive shaft 76 along the radial axis 42. The protrusions 253, 258 and their respective seals 255, 259 may also define and seal the extension cavity 260 and block fluid flow from the extension cavity 260. As shown, the extension cavity 260 is fluidly coupled to a first passageway 262 (e.g., extension passageway) that extends through the drive shaft 76 and through a rotary union 264 that enables transfer of a fluid between components that rotate relative to one another. It should be understood that the first passageway 262 may be positioned in any suitable plane or location within the drive shaft 76 to provide fluid to the extension cavity 260. Indeed, while certain passageways and ports may be illustrated (e.g., in solid or dotted lines) in various locations to facilitate discussion, it should be understood that any of the passageways and ports disclosed herein may be positioned in any of a variety of planes or locations about the transmission 64 to fluidly couple respective components (e.g., fluid sources and cavities) to one another. In the illustrated embodiment, the rotary union 264 includes a first component 266 (e.g., annular component) that is coupled to and/or fixed relative to the transmission housing 65 and a second component 268 (e.g., annular component) that is coupled to the drive shaft 76 (e.g., non-rotatably coupled to the drive shaft 76 such that the second component 268 rotates with the drive shaft 76 and relative to the first component 266). In operation, a respective shift valve 214 (e.g., an extension valve) may be controlled to adjust a flow of a fluid (e.g., pressurized pneumatic or hydraulic fluid) through the first passageway 262 to the extension cavity 260, thereby driving the sleeve 250 into the first position 252, as shown by arrow 269.

As shown, the transmission 64 includes a bearing 270 (e.g., ball bearing) to support the drive shaft 76 and/or to facilitate rotation of the drive shaft 76 relative to the transmission housing 65. In the illustrated embodiment, a seal carrier 246 (e.g., annular seal carrier) supporting one or more seals 248 (e.g., annular seals) may be provided to block a flow of fluid (e.g., lubricant, pressurized pneumatic or hydraulic fluid, or the like) from the rotary union 264 and/or the transmission 64. The illustrated embodiment includes the sensor 145 (e.g., inductive proximity switch, position sensor, gear ratio sensor, or the like) configured to monitor a position of the sleeve 250. As shown, the sleeve 250 includes a radially-outwardly extending protrusion 276 (e.g., annular protrusion) that may be detected by the sensor 145. In the illustrated embodiment, the sensor 145 is a proximity switch; however, it should be understood that the sensor 145 may be any suitable type of sensor (e.g., optical, acoustic, magnetic, or the like) that is configured to detect the position of the sleeve 250 and to provide an output (e.g., a signal) indicative of the position of the sleeve 250.

Figure 18:
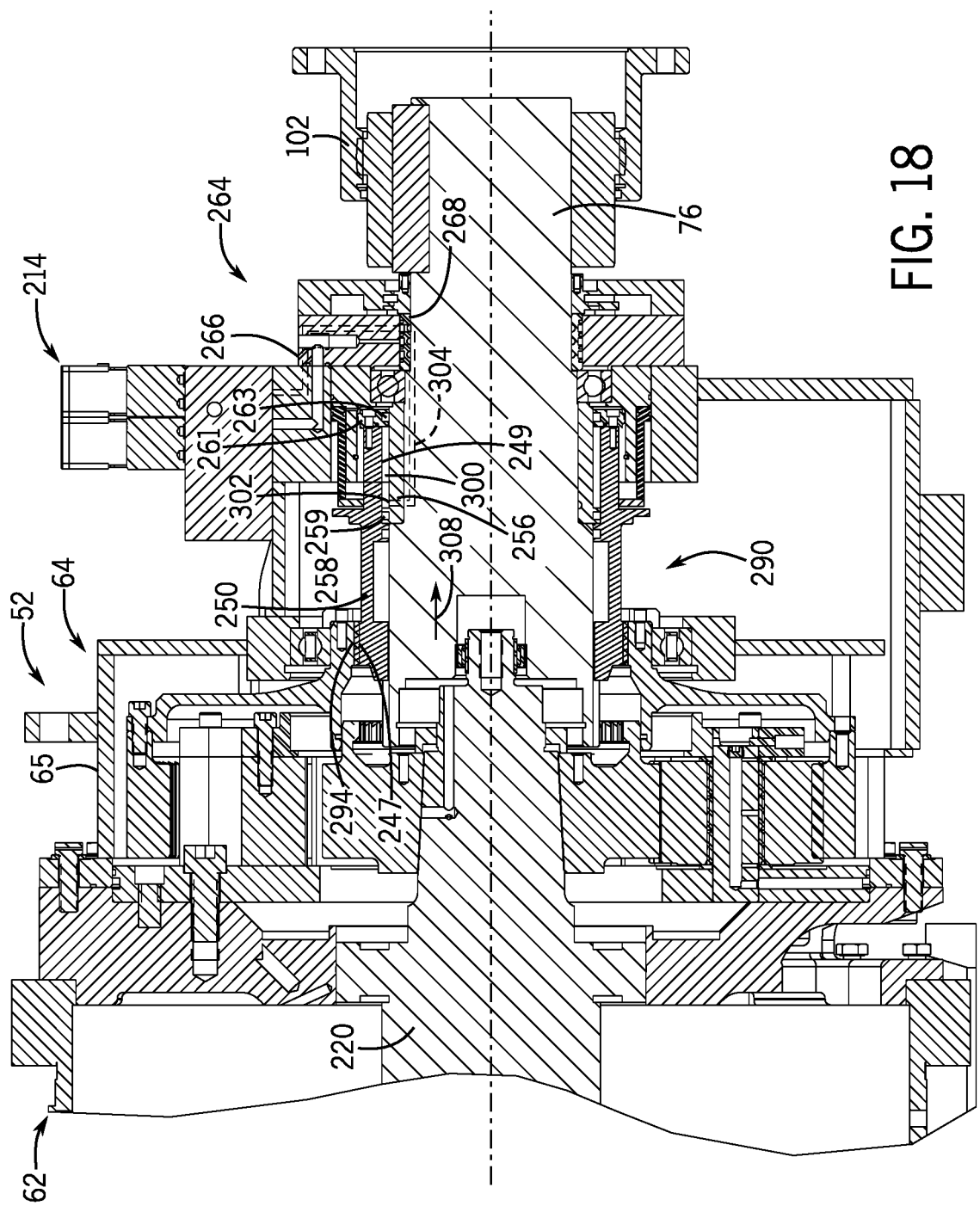
FIG. 18 is a cross-sectional side view of the transmission of FIG. 17, wherein the annular sleeve of the transmission is in a retracted position.

FIG. 18 is a cross-sectional side view of a portion of the transmission 64 with the sleeve 250 in a second position 290 (e.g., retracted position). When the sleeve 250 is in the illustrated second position 290, the radially-outer surface 247 of the sleeve 250 engages the ring gear 236 (e.g., non-rotatably engages the ring gear 236 via a splined interface 294, such as one or more male and female splines or mating teeth or grooves, to rotate the sleeve 250 with the ring gear 236), and thus, the transmission 64 provides a different gear ratio (e.g., a 2:1 gear ratio) to adjust the power output by the motor 62.

In the illustrated embodiment, a retraction cavity 300 (e.g., annular cavity or sealed cavity) is defined between the inner wall 249 of the sleeve 250 and an outer wall 302 (e.g., radially-outer wall or annular surface) of the support sleeve 256 along the radial axis 42. The protrusions 258, 261 and their respective seals 259, 263 may also define and seal the retraction cavity 300 and block fluid flow from the retraction cavity 300. As shown, the retraction cavity 300 is fluidly coupled to a second passageway 304 (e.g., retraction passageway) that extends through the drive shaft 76 and through components 266, 268 of the rotary union 264. In operation, a respective shift valve 214 (e.g., a retraction valve) may be controlled to adjust a flow of a fluid (e.g., pressurized pneumatic or hydraulic fluid) through the second passageway 304 to the retraction cavity 300, thereby driving the sleeve 250 into the second position 290, as shown by arrow 308.

Figure 19:
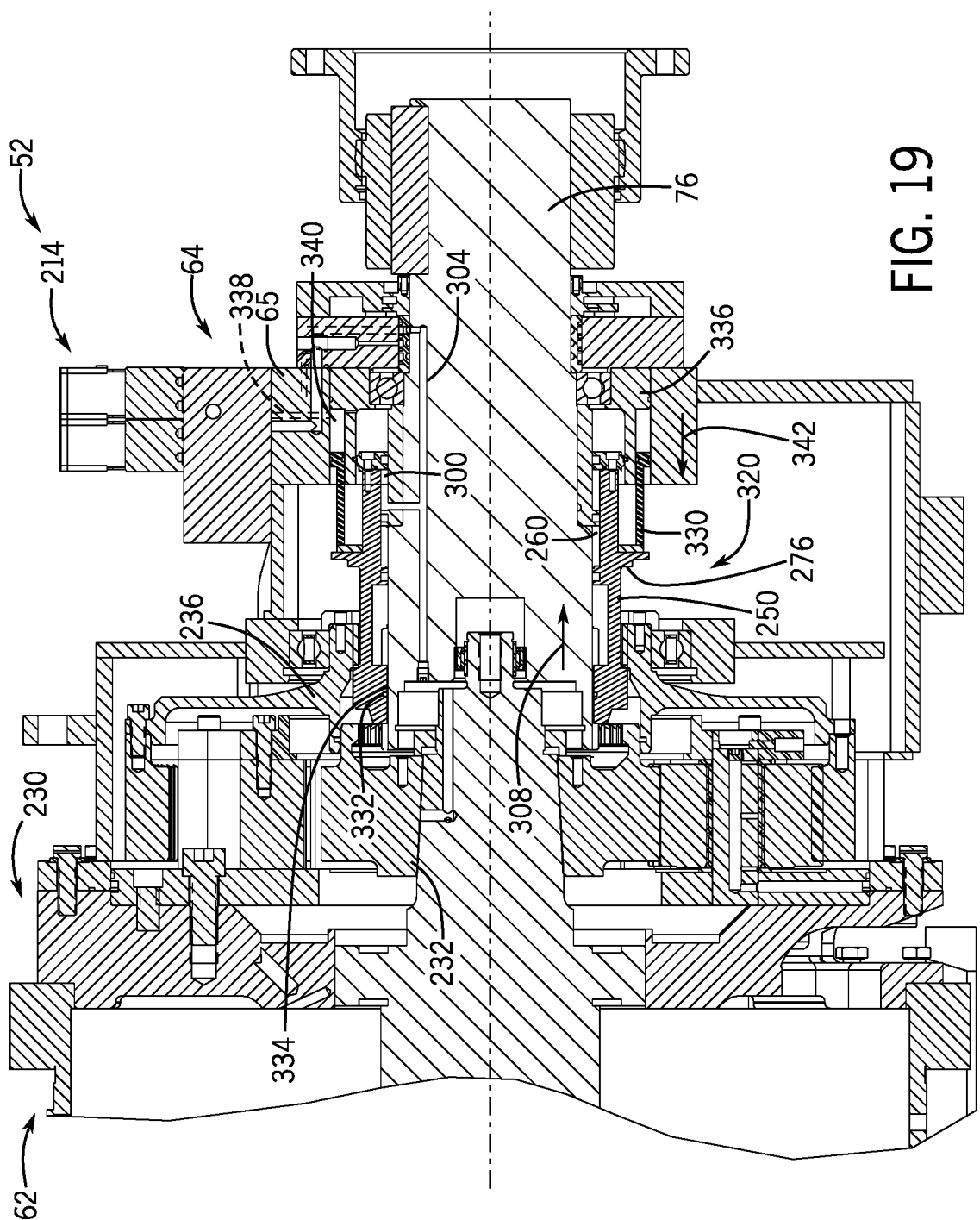
FIG. 19 is a cross-sectional side view of the transmission of FIG. 17, wherein the annular sleeve of the transmission is in an intermediate position.

FIG. 19 is a cross-sectional side view of a portion of the transmission 64 with the sleeve 250 in a third position 320 (e.g., intermediate or neutral position). In the third position 320, the sleeve 250 is positioned between the first position 252 and the second position 290 along the axial axis 40 and does not engage the gearset 230 (e.g., the radially-outer surface 247 of the sleeve 250 does not engage the planetary gearset 230), and thus, the transmission 64 is in neutral, such that rotation of the motor shaft 220 is not transferred to the drive shaft 76.

The transmission 64 may include various features to enable the sleeve 250 to achieve and/or to maintain the intermediate position 320. For example, in the illustrated embodiment, the transmission 64 includes an adjustable stop 330 (e.g., annular stop or sleeve) that is configured to limit and/or to block movement of the sleeve 250 along the axial axis 40. As shown, a détente 332 (e.g., annular détente) is provided about the radially-inner surface 249 of the sleeve 250 and is configured to engage a groove 334 (e.g., annular groove) in the radially-outer surface 257 of the drive shaft 76. In some embodiments, the détente 332 may include multiple spring loaded balls arranged circumferentially about the radially-inner surface 249, although any suitable arrangement is envisioned. Together, the adjustable stop 330 and the détente 332 may support the sleeve 250 in the intermediate position 320 without energizing the shift valve 214 that provides the fluid to the retraction chamber 300. In the illustrated embodiment, a wear sleeve 336 (e.g., annular wear sleeve or thrust bearing) is provided between the adjustable stop 330 and the sleeve 250 along the radial axis 42 to facilitate relative axial movement between the adjustable stop 330 and the sleeve 250.

In operation, to shift from the first position 252 to the intermediate position 320, the respective shift valve 214 may be controlled to provide fluid to the retraction chamber 300 via the second passageway 304, thereby driving the sleeve 250 axially relative to the drive shaft 76 in a first direction, as shown by arrow 308. At the same time, a respective shift valve 214, or other suitable valve, may be controlled to provide a flow of fluid through a stop passageway 338 to a stop space 340 (e.g., annular space) to drive the stop 330 axially in a second direction, opposite the first direction, as shown by arrow 342. The stop 330 may contact the sleeve 250 (e.g., the protrusion 276 of the sleeve 250) to block the sleeve 250 from moving axially to the second position 290 and may block the sleeve 250 from engaging the ring gear 236. In some embodiments, the fluid pressure within the retraction cavity 300 and/or the stop space 340 may be removed, and the sleeve 250 may remain in the intermediate position 320 via the stop 330 and/or the détente 332, which may block the sleeve 250 from engaging the sun gear 232 unless fluid is provided to the extension cavity 260 to drive the détente 332 out of the corresponding groove 334 and/or block the sleeve 250 from engaging the ring gear 236 unless fluid is provided to the retraction cavity 300 to drive the détente 332 out of the corresponding groove 334. In some embodiments, the détente 332 may be utilized to maintain the sleeve 250, and thus, the gear ratio, in any of the first position 252, the second position 290, or the third position 320 relative to the drive shaft 76 without energizing the shift valves 214 and/or without maintaining fluid pressure in the respective cavities or spaces 260, 300, 340, for example.

It should be understood that the shift valves 214 may be controlled by a controller (e.g., electronic controller having a processor and a memory), such as the controller 136. As discussed above, the controller 136 may be configured to receive an input (e.g., an operator input via the user interface 142 of the controller 136 or a control signal) and may respond to the input to open and/or to close the shift valves 214 to adjust the position of the sleeve 250, and thereby adjust the gear ratio of the transmission 64. Thus, in the illustrated embodiment, the transmission 64 may shift gears without use of a clutch and/or a brake, for example. Furthermore, the various fluid passageways (e.g., the first passageway 262, the second passageway 304, and the stop passageway 338) are shown in a simplified form and/or certain fluid passageways are omitted from some of the figures to facilitate discussion. It should be understood that these passageways 262, 304, 338, as well as various lubricant passageways, may generally extend from a fluid source, through the transmission housing 65, through the rotary union 264, and/or through the drive shaft 76 to respective cavities (e.g., the extension cavity 260, the retraction cavity 300, the stop space 340). Each of the various passageways 262, 304, 338, as well as various lubricant passageways, may be distributed circumferentially and/or axially (e.g., positioned at discrete locations) about the transmission 64 (e.g., the transmission housing 65, the rotary union 264, the drive shaft 76) to facilitate fluid flow to the respective cavities.

Figure 20:
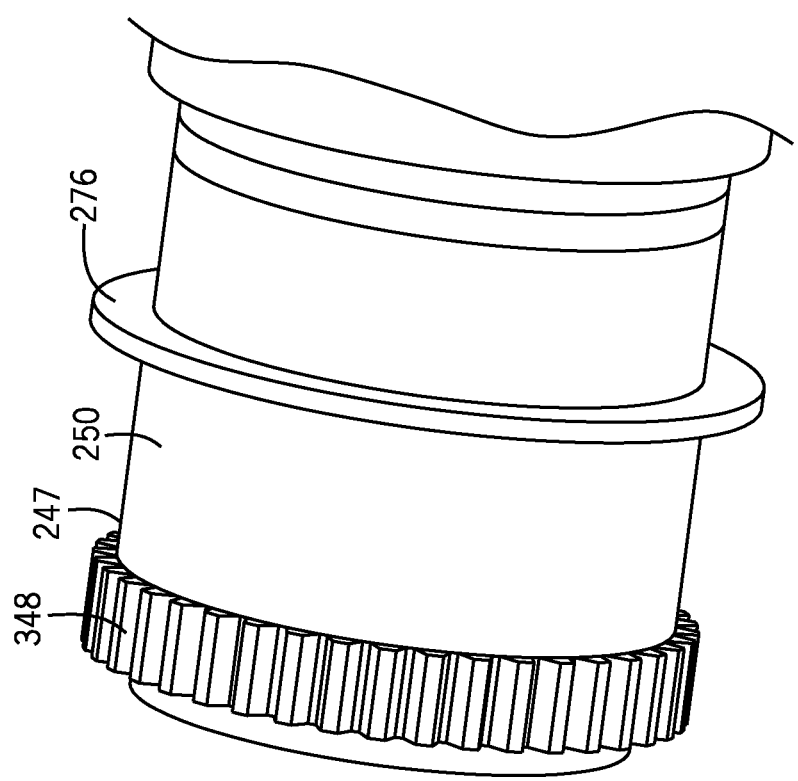
FIG. 20 is a perspective view of an embodiment of the annular sleeve that may be used within the transmission of FIG. 17.

FIG. 20 is a perspective view of a portion of the sleeve 250 that may be utilized in the transmission 64. As shown, a splined surface 348 (e.g., external splined surface having one or more male and female splines or teeth or grooves) is formed about the radially-outer surface 247 of the sleeve 250 to engage the sun gear 232 and the ring gear 236 to shift gears. The sleeve 250 also includes the radially-outwardly extending protrusion 276 that may enable the sensor 145 to monitor the position of the sleeve 250 within the transmission housing 65.

Figure 21:
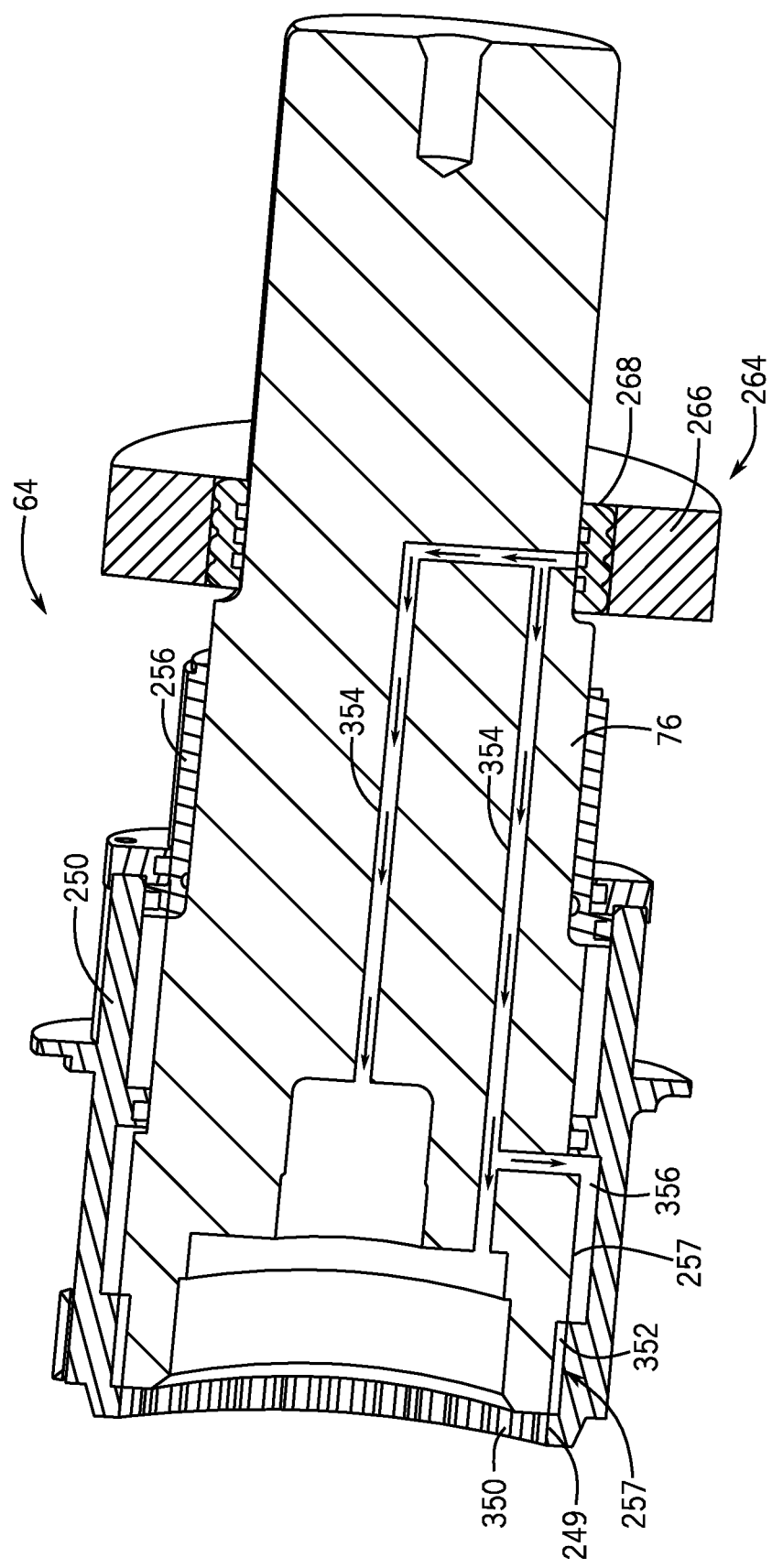
FIG. 21 is a perspective view of an embodiment of a lubricant passageway that may be used within a drive shaft of the transmission of FIG. 17.

FIG. 21 is a cross-sectional perspective view of a portion of the transmission 64, including the sleeve 250, the support sleeve 256, the drive shaft 76, and the rotary union 264. As shown, a splined surface 350 (e.g., internal splined surface having one or more male and female splines or teeth or grooves) is formed along the radially-inner surface 249 of the sleeve 250 to engage a corresponding splined surface 352 (e.g., external splined surface having one or more male and female splines or teeth or grooves) of the outer wall 257 of the drive shaft 76 at the splined interface 251. The splined interface 251 enables the sleeve 250 to drive rotation of the drive shaft 76 and enables the sleeve 250 to move axially relative to the drive shaft 76. As shown, the drive shaft 76 includes a lubricant passageway 354 to enable a flow of fluid (e.g., lubricant or oil) to the cavity 221 of the drive shaft 76 that is configured to surround the motor shaft 220 and/or to support bearings (e.g., the first bearing 240 and the second bearing 242) positioned between the motor shaft 220 and the drive shaft 76. As shown, in some embodiments, the lubricant passageway 354 may direct the flow of fluid to an interface 356 (e.g., annular space or annular contacting surfaces) between the radially-inner surface 249 of the sleeve 250 and the outer wall 257 of the drive shaft 76 to facilitate axial movement of the sleeve 250 relative to the drive shaft 76. In some embodiments, the lubricant passageway 354 may extend through the rotary union 264 (e.g., the first and second components 266, 268) to enable the flow of fluid from a lubricant source (e.g., storage tank) to the lubricant passageway 354, and the flow of fluid may be controlled by one of the shift valves 214, in some embodiments.

Figure 22:
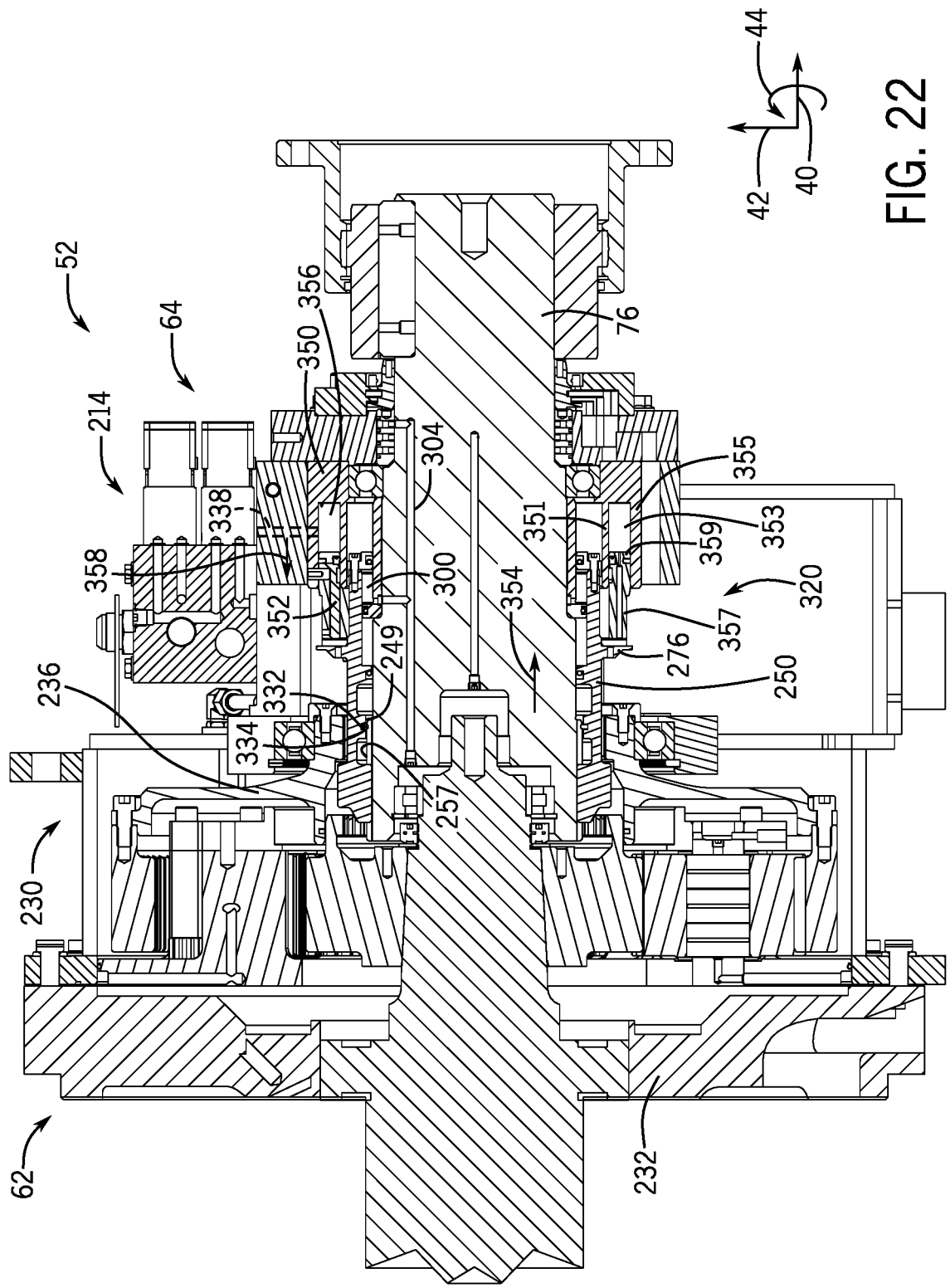
FIG. 22 is a cross-sectional side view of an embodiment of a portion of a motor assembly that may be used in the drawworks system of FIG. 2.

As noted above, the components of the drawworks system 22 may have any of a variety of configurations. For example, FIG. 22 is a cross-sectional side view of an embodiment of a portion of the transmission 64 having a double-walled wear sleeve 350 (e.g., annular wear sleeve or thrust bearing) supporting an adjustable stop 352 (e.g., annular stop or sleeve). The double-walled wear sleeve 350 and the stop 352 may generally operate in a similar manner as the wear sleeve 336 and the stop 330 discussed above with respect to FIG. 19, and the various other features of the transmission 64 illustrated in FIG. 22 may generally operate in a similar manner as discussed above with respect to FIGS. 1-21 (e.g., the sleeve 250 may be driven to move between the first position 252 and the second position 290 to shift gears).

As shown, the double-walled wear sleeve 350 includes a radially-inner wall 351 (e.g., annular wall) and a radially-outer wall 355 (e.g., annular wall) that define an annular space 353 configured to receive and/or to support the stop 352. As shown, the stop 352 includes a first end 357 configured to contact the sleeve 250 (e.g., the protrusion 276 of the sleeve 250) and a second end 359 that is positioned within the annular space 355. In FIG. 22, the sleeve 250 is the third position 320 in which the sleeve 250 is positioned between the first position 252 and the second position 290 along the axial axis 40 and does not engage the gearset 230, and thus, the transmission 64 is in neutral, such that rotation of the motor shaft 220 is not transferred to the drive shaft 76. At least a portion of the double-walled wear sleeve 350 is positioned between the stop 352 and the sleeve 250 along the radial axis 42 to facilitate relative axial movement between the stop 352 and the sleeve 250, and the stop 352 is configured to limit and/or to block movement of the sleeve 250 along the axial axis 40. As shown, the détente 332 is provided about the radially-inner surface 249 of the sleeve 250 and is configured to engage the groove 334 in the radially-outer surface 257 of the drive shaft 76. Together, the stop 352 and the détente 332 may support the sleeve 250 in the intermediate position 320 without energizing the shift valve 214 that provides the fluid to the retraction chamber 300.

In operation, to shift from the first position 252 to the intermediate position 320, the respective shift valve 214 may be controlled to provide fluid to the retraction chamber 300 via the second passageway 304, thereby driving the sleeve 250 axially relative to the drive shaft 76 in a first direction, as shown by arrow 354. At the same time, a respective shift valve 214, or other suitable valve, may be controlled to provide a flow of fluid through the stop passageway 338 to a stop space 356 (e.g., annular space) to drive the stop 352 axially in a second direction, opposite the first direction, as shown by arrow 358. The stop 352 may block the sleeve 250 from moving axially to the second position 290 and may block the sleeve 250 from engaging the ring gear 236. In some embodiments, the fluid pressure within the retraction cavity 330 and/or the stop space 356 may be removed, and the sleeve 250 may remain in the intermediate position 320 via the stop 352 and/or the détente 332, which may block the sleeve 250 from engaging the sun gear 232 unless fluid is provided to the extension cavity 260 to drive the détente 332 out of the corresponding groove 334 and/or block the sleeve 250 from engaging the ring gear 236 unless fluid is provided to the retraction cavity 300 to drive the détente 332 out of the corresponding groove 334.

The motor assembly 52 illustrated in FIGS. 13-22 may facilitate the method 150 of FIG. 12. For example, multiple motors 62 of the drawworks system 22 may be operated at a designated power and with respective sleeves 250 of the respective transmissions 64 in the first position 252 to provide a first gear ratio (e.g., 1:1 gear ratio) to drive rotation of the drum 54 via the gearbox 56 and to move a load at a first speed. As noted above, to achieve the first position 252, fluid may be provided to the extension cavity 260 to drive the sleeve 250 axially relative to the drive shaft 76 to engage the sun gear 232 of the gearset 230.

After application of the brake 58 to block rotation of the drum 54, a first transmission 64 coupled to a first motor 62 (e.g., a failed motor) may be switched to a neutral position by controlling a respective valve 214 to provide a fluid to the retraction chamber 300 to drive the sleeve 250 axially away from the sun gear 232 and also controlling a respective valve 214 to provide a fluid to drive the stop 330 in the opposite direction along the axial axis 40 to limit movement of the sleeve 250 and to block the sleeve 250 from engaging the ring gear 236.

In operation, a second transmission 64 coupled to a second motor 62 (e.g., an intact motor) may be switched from the first gear ratio to a second gear ratio (e.g., 2:1 gear ratio) by controlling a respective valve 214 to provide a fluid to the retraction chamber 300 to drive the sleeve 250 axially away from the sun gear 232 until the sleeve 250 engages the ring gear 236. The brake 58 may then be returned to the non-braked position to enable rotation of the drum 154, and the second motor 62 that is coupled to the second transmission 64 that is set at the second gear ratio may be operated at the designated power to move the load (e.g., the load at approximately half of the first speed). Such a configuration may reduce downtime, increase the efficiency of certain drilling operations (e.g., by enabling completion of certain drilling operations), and/or may enable delay of repair to the first motor 62 until a more convenient time, for example.

While the disclosure may be susceptible to various modifications and alternative forms, specific embodiments have been shown by way of example in the drawings and have been described in detail herein. However, it should be understood that the disclosure is not intended to be limited to the particular forms disclosed. Rather, the disclosure is to cover all modifications, equivalents, and alternatives falling within the spirit and scope of the disclosure as defined by the following appended claims. Furthermore, any of the features and components of FIGS. 1-22 may be utilized together and/or combined in any suitable manner.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. A system, comprising:
   a first transmission, comprising:
      a first planetary gearset;
      a first drive shaft;
      a first annular sleeve positioned circumferentially about the first drive shaft, wherein the first annular sleeve is configured to move axially relative to the first drive shaft and the first planetary gearset from a first axial position in which the first annular sleeve engages a first sun gear of the first planetary gearset to a second axial position in which the first annular sleeve engages a first ring gear of the first planetary gearset to adjust a gear ratio of the first transmission; and
   a motor assembly comprising the first transmission and a first motor, wherein the first transmission is configured to adjust a first power output of the first motor, and the motor assembly is configured to drive rotation of a drum of a drawworks system of a mineral extraction system.

2. The system of claim 1, wherein an internal surface of the first annular sleeve is configured to engage an external surface of the first drive shaft to non-rotatably couple the first annular sleeve to the first drive shaft.

3. The system of claim 1, wherein a radially-outer surface of the first annular sleeve is configured to engage a first radially-inner surface of the first sun gear when the first annular sleeve is in the first axial position and a second radially-inner surface of the first ring gear when the first annular sleeve is in the second axial position.

4. The system of claim 3, wherein the radially-outer surface of the first annular sleeve comprises a splined surface configured to engage the first radially-inner surface of the first sun gear and the second radially-inner surface of the first ring gear.

5. The system of claim 1, comprising an extension cavity defined between the first annular sleeve and the first drive shaft, wherein the extension cavity is configured to receive a fluid to drive the first annular sleeve axially relative to the first drive shaft to the first axial position.

6. The system of claim 5, wherein the fluid is provided to the extension cavity via an extension passageway that extends through the first drive shaft.

7. The system of claim 6, comprising a rotary union comprising a first component supported by a housing of the first transmission and a second component non-rotatably coupled to the first drive shaft, wherein the rotary union facilitates flow of the fluid from a fluid source into the extension passageway within the first drive shaft.

8. The system of claim 1, wherein the first motor is configured to drive a motor shaft that is non-rotatably coupled to the first sun gear of the first planetary gearset.

9. The system of claim 8, wherein the motor shaft and the first drive shaft are coaxial, and one end of the motor shaft is positioned within a cavity formed in a respective end of the first drive shaft.

10. The system of claim 8, comprising a motor housing supporting the first motor, a transmission housing supporting the first transmission, and an annular adapter coupled to the motor housing and the transmission housing.

11. The system of claim 1, comprising:
a second transmission comprising a second planetary gearset, a second drive shaft, and a second annular sleeve configured to move axially relative to the second drive shaft and the second planetary gearset to adjust a second gear ratio of the second transmission; and
a second motor, wherein the first transmission is configured to adjust a first power output of the first motor and the second transmission is configured to adjust a second power output of the second motor.

12. A system, comprising:
a motor assembly configured to drive rotation of a drum of a drawworks system of a mineral extraction system, comprising:
a first motor housing supporting a first motor;
a first transmission housing supporting a first transmission configured to adjust a first power output of the first motor, wherein the first transmission comprises a first drive shaft and a first annular sleeve positioned circumferentially about the first drive shaft, and the first annular sleeve is configured to move axially relative to the first drive shaft to change a first gear ratio of the first transmission; and
a second motor and a second transmission configured to adjust a second power output of the second motor.

13. The system of claim 12, wherein the first motor comprises a motor shaft, and the motor shaft and the first drive shaft are coaxial.

14. The system of claim 12, wherein a motor shaft of the first motor is non-rotatably coupled to a sun gear of a planetary gearset of the first transmission, and the first annular sleeve is configured to engage the sun gear in a first axial position and to engage a ring gear of the planetary gearset in a second axial position.

15. The system of claim 14, wherein the first annular sleeve comprises a splined external surface that is configured to engage the sun gear in the first axial position and the ring gear in the second axial position.

16. The system of claim 14, comprising fluid passageways within the first drive shaft that are configured to flow a fluid to drive the first annular sleeve between the first axial position and the second axial position.

17. The system of claim 12, wherein the first motor housing and the first transmission housing are coupled to one another via an annular adapter.

18. A method of operating a motor assembly of a drawworks system of a mineral extraction system, comprising:
operating a first motor coupled to a first transmission to adjust a first power output of the first motor while a first annular sleeve positioned about a radially-outer surface of a first drive shaft of the first transmission is in a first axial position relative to the first drive shaft, wherein the first transmission provides a first gear ratio while the first annular sleeve is in the first axial position;
adjusting the first annular sleeve from the first axial position to a second axial position relative to the drive shaft of the transmission to provide a second gear ratio; and
operating a second motor coupled to a second transmission to adjust a second power output of the second motor.

19. The method of claim 18, wherein the first annular sleeve is adjusted to provide a neutral gear ratio and the second transmission is adjusted to enable the motor assembly to lift a load using the second motor only.

20. The method of claim 18, wherein operating the first motor and the second motor comprises receiving a sensor signal that indicates a condition of the motor assembly and automatically adjust the first power output or the second power output based on the sensor signal.

* * * * *